US012720450B2

(12) United States Patent
Wu et al.

(10) Patent No.: US 12,720,450 B2
(45) Date of Patent: Aug. 25, 2026

(54) TECHNIQUES FOR FULL-DUPLEX SIDELINK AND UPLINK TRANSMISSIONS

(71) Applicant: QUALCOMM INCORPORATED, San Diego, CA (US)

(72) Inventors: Shuanshuan Wu, San Diego, CA (US); Kapil Gulati, Belle Mead, NJ (US); Junyi Li, Fairless Hills, PA (US); Anantharaman Balasubramanian, San Diego, CA (US); Hui Guo, Beijing (CN); Sourjya Dutta, San Diego, CA (US); Navid Abedini, Basking Ridge, NJ (US)

( * ) Notice: Subject to any disclaimer, the term of this patent is extended or adjusted under 35 U.S.C. 154(b) by 249 days.

(21) Appl. No.: 18/264,050

(22) PCT Filed: Mar. 23, 2021

(86) PCT No.: PCT/CN2021/082332

§ 371 (c)(1),
(2) Date: Aug. 2, 2023

(87) PCT Pub. No.: WO2022/198435

PCT Pub. Date: Sep. 29, 2022

(65) Prior Publication Data

US 2024/0098657 A1 Mar. 21, 2024

(51) Int. Cl.
*H04W 52/38* (2009.01)
*H04W 52/24* (2009.01)

(52) U.S. Cl.
CPC ....... *H04W 52/383* (2013.01); *H04W 52/243* (2013.01)

(58) Field of Classification Search
CPC . H04W 52/383; H04W 52/243; H04W 52/14; H04W 52/38; H04W 52/24
See application file for complete search history.

(56) References Cited

U.S. PATENT DOCUMENTS

2020/0178221 A1* 6/2020 Byun ...................... H04W 4/08
2020/0252820 A1 8/2020 Ozturk et al.

(Continued)

FOREIGN PATENT DOCUMENTS

CN 103281788 A 9/2013
CN 106465284 A 2/2017

(Continued)

OTHER PUBLICATIONS

Supplementary European Search Report—EP21932067—Search Authority—The Hague—Nov. 20, 2024 (2102114EP).

(Continued)

*Primary Examiner* — John J Lee

(57) ABSTRACT

Methods, systems, and devices for wireless communications are described. In some examples, a base station may schedule a multi-transmission reception point (mTRP) UE for concurrent uplink and sidelink transmissions based on interference measurements. For example, a base station may determine an amount of interference associated with resources used for sidelink communications between the mTRP UE and a second UE. Based on the determined amount of interference, the base station may transmit a resource grant to the mTRP UE indicating a first set of resource for transmitting one or more uplink messages to the base station and a second set of resources for transmitting one or more sidelink messages to the second UE, where the first set of resources and the second set of resources at least partially overlap in time.

28 Claims, 17 Drawing Sheets

(56) References Cited

U.S. PATENT DOCUMENTS

| | | | | |
|---|---|---|---|---|
| 2021/0250913 | A1* | 8/2021 | Ganesan | H04W 72/02 |
| 2023/0354152 | A1* | 11/2023 | Bangolae | H04W 40/22 |

FOREIGN PATENT DOCUMENTS

| | | | |
|---|---|---|---|
| CN | 109474914 | A | 3/2019 |
| CN | 110832926 | A | 2/2020 |
| CN | 111385763 | A | 7/2020 |
| KR | 20190027654 | A | 3/2019 |
| WO | WO-2020088756 | A1 | 5/2020 |
| WO | WO-2020190646 | A1 | 9/2020 |
| WO | WO-2020214007 | A1 | 10/2020 |

OTHER PUBLICATIONS

International Search Report and Written Opinion—PCT/CN2021/082332—ISA/EPO—Nov. 1, 2021 (2102114WO1).

* cited by examiner

500

900

1100

TECHNIQUES FOR FULL-DUPLEX SIDELINK AND UPLINK TRANSMISSIONS

CROSS REFERENCE

The present Application is a 371 national stage filing of International PCT Application No. PCT/CN2021/082332 by W U et al. entitled "TECHNIQUES FOR FULL-DUPLEX SIDELINK AND UPLINK TRANSMISSIONS," filed Mar. 23, 2021, which is assigned to the assignee hereof, and which is expressly incorporated by reference in its entirety herein.

FIELD OF TECHNOLOGY

The following relates to wireless communications, including techniques for full-duplex sidelink and uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems, such as systems that support sidelink communications (which may be referred to as vehicle-to-vehicle (V2V) or vehicle-to-everything (V2X) communications), may support devices having multiple transmission reception points (TRPs). For example, a UE may include multiple TRPs, and the UE may be capable of operating in a full-duplex mode, where different TRPs may be used to simultaneously transmit and/or receive signals. However, in some cases, when concurrent uplink and sidelink transmissions are scheduled for a multi-TRP (mTRP) UE, the mTRP UE may have to drop one or more of the uplink transmission or the sidelink transmission.

SUMMARY

The described techniques relate to improved methods, systems, devices, and apparatuses that support techniques for full-duplex sidelink and uplink transmissions. Generally, the described techniques provide for a base station to schedule a multi-transmission reception point (m-TRP) UE for concurrent uplink and sidelink transmissions (e.g., full-duplex communications) based on interference information. For example, a first UE and a second UE may communicate over a sidelink communication link, and the first UE may provide the second UE with transmission configuration information (e.g., an uplink transmission configuration) associated with a communication link (e.g., an access link) between the first UE and a base station. Based on the transmission configuration information from the first UE, the second UE may perform one or more measurements to identify interference on the sidelink communication link based on uplink transmissions from the first UE to the base station. In such cases, the second UE may perform the measurements on a directional beam (e.g., a receive beam) that the second UE intends to use (or is using) for sidelink communications with the first UE, which may be based on the transmission configuration information provided by the first UE. Upon performing the measurements, the second UE may report the measurement results (e.g., directly to the base station or to the first UE).

The base station, in turn, may determine whether full-duplex communications may be supported by the first UE based on the measurement results. For example, the base station may determine an amount of interference associated with resources the UE may utilize for sidelink or uplink transmissions. Here, the base station may perform its own measurements of signals transmitted over the sidelink (e.g., between the first UE and the second UE) to determine an amount of interference on uplink signals from the first UE. In any case, if the determined amount of interference is below a threshold, the base station may determine simultaneous transmissions are possible for the first UE and transmit a resource grant to the first UE granting resources for simultaneous transmission of one or more sidelink messages and one or more uplink messages, where the resources at least partially overlap in time.

A method for wireless communications at a first UE is described. The method may include establishing a first communication link with a base station and a sidelink communication link with a second UE, transmitting an indication of an uplink transmission configuration associated with the first communication link to the second UE, the uplink transmission configuration identifying one or more resources for uplink transmissions between the first UE and the base station, receiving, from the base station, a resource grant for one or more uplink messages over the first communication link and one or more sidelink messages over the sidelink communication link, the one or more uplink messages being concurrent with the one or more sidelink messages, where the resource grant is received based on an amount of interference associated with the one or more resources for uplink transmissions, and transmitting the one or more sidelink messages to the first UE over the sidelink communication link and the one or more uplink messages to the base station over the first communication link based on receiving the resource grant.

An apparatus for wireless communications at a first UE is described. The apparatus may include a processor, memory coupled with the processor, and instructions stored in the memory. The instructions may be executable by the processor to cause the apparatus to establish a first communication link with a base station and a sidelink communication link with a second UE, transmit an indication of an uplink transmission configuration associated with the first communication link to the second UE, the uplink transmission configuration identifying one or more resources for uplink transmissions between the first UE and the base station, receive, from the base station, a resource grant for one or more uplink messages over the first communication link and one or more sidelink messages over the sidelink communication link, the one or more uplink messages being concurrent with the one or more sidelink messages, where the resource grant is received based on an amount of interference associated with the one or more resources for uplink transmissions, and transmit the one or more sidelink messages to the first UE over the sidelink communication link and the one or more uplink messages to the base station over the first communication link based on receiving the resource grant.

Another apparatus for wireless communications at a first UE is described. The apparatus may include means for establishing a first communication link with a base station and a sidelink communication link with a second UE, means for transmitting an indication of an uplink transmission configuration associated with the first communication link to the second UE, the uplink transmission configuration identifying one or more resources for uplink transmissions between the first UE and the base station, means for receiving, from the base station, a resource grant for one or more uplink messages over the first communication link and one or more sidelink messages over the sidelink communication link, the one or more uplink messages being concurrent with the one or more sidelink messages, where the resource grant is received based on an amount of interference associated with the one or more resources for uplink transmissions, and means for transmitting the one or more sidelink messages to the first UE over the sidelink communication link and the one or more uplink messages to the base station over the first communication link based on receiving the resource grant.

A non-transitory computer-readable medium storing code for wireless communications at a first UE is described. The code may include instructions executable by a processor to establish a first communication link with a base station and a sidelink communication link with a second UE, transmit an indication of an uplink transmission configuration associated with the first communication link to the second UE, the uplink transmission configuration identifying one or more resources for uplink transmissions between the first UE and the base station, receive, from the base station, a resource grant for one or more uplink messages over the first communication link and one or more sidelink messages over the sidelink communication link, the one or more uplink messages being concurrent with the one or more sidelink messages, where the resource grant is received based on an amount of interference associated with the one or more resources for uplink transmissions, and transmit the one or more sidelink messages to the first UE over the sidelink communication link and the one or more uplink messages to the base station over the first communication link based on receiving the resource grant.

Some examples of the method, apparatuses, and non-transitory computer-readable medium described herein may further include operations, features, means, or instructions for transmitting an indication of a sidelink transmission configuration to the base station, the sidelink transmission configuration identifying one or more resources for sidelink transmissions between the first UE and the second UE.

In some examples of the method, apparatuses, and non-transitory computer-readable medium described herein, the sidelink transmission configuration includes a configuration of one or more sidelink reference signals, a configuration of a sidelink channel, an identifier (ID) associated with the second UE, an ID associated with a TRP at the first UE associated with the sidelink communication link, a precoder associated with the TRP, a transmit power associated with sidelink transmissions between the first UE and the second UE, a modulation and coding scheme (MCS) associated with sidelink transmissions between the first UE and the second UE, or any combination thereof.

Some examples of the method, apparatuses, and non-transitory computer-readable medium described herein may further include operations, features, means, or instructions for receiving, from the second UE, an interference measurement report, the interference measurement report indicating the amount of interference associated with the one or more resources for uplink transmissions and transmitting the interference measurement report to the base station, where receiving the resource grant may be based on transmitting the interference measurement report.

Some examples of the method, apparatuses, and non-transitory computer-readable medium described herein may further include operations, features, means, or instructions for receiving a transmit power control message from the base station, the transmit power control message instructing the first UE to adjust one or both of a transmit power associated with the one or more sidelink messages or a transmit power associated with the one or more uplink messages, where transmitting the one or more uplink messages and the one or more sidelink messages may be based on the transmit power control message.

In some examples of the method, apparatuses, and non-transitory computer-readable medium described herein, a first TRP at the first UE associated with the first communication link and a second TRP at the first UE associated with the sidelink communication link share a transmission power and the method, apparatuses, and non-transitory computer-readable medium may include further operations, features, means, or instructions for adjusting the transmit power associated with the one or more uplink messages by a first amount and adjusting the transmit power associated with the one or more sidelink messages by a second amount based on the transmit power control message, where one or both of the first amount or the second amount may be based on a downlink path loss and the amount of interference, and where a combination of the adjusted transmit power associated with the one or more uplink messages and the adjusted the transmit power associated with the one or more sidelink messages may be equal to or less than a threshold transmit power.

In some examples of the method, apparatuses, and non-transitory computer-readable medium described herein, a first TRP at the first UE associated with the first communication link may be associated with a first transmission power and a second TRP at the first UE may be associated with the sidelink communication link may be associated with a second transmission power and the method, apparatuses, and non-transitory computer-readable medium may include further operations, features, means, or instructions for adjusting the transmit power associated with the one or more uplink messages by a first amount and adjusting the transmit power associated with the one or more sidelink messages by a second amount based on the transmit power control message, where the first amount and the second amount may be based on the amount of interference.

In some examples of the method, apparatuses, and non-transitory computer-readable medium described herein, the first communication link may be associated with a first TRP of a set of TRPs at the first UE and the sidelink communication link may be associated with a second TRP of the set of TRPs at the first UE.

In some examples of the method, apparatuses, and non-transitory computer-readable medium described herein, the amount of interference includes an reference signal received power (RSRP), a signal-to-noise ratio (SNR), a received signal strength indicator (RSSI), or any combination thereof, associated with the one or more resources for uplink transmissions.

In some examples of the method, apparatuses, and non-transitory computer-readable medium described herein, the resource grant includes at least one of a configured grant or a dynamic grant.

A method for wireless communications at a first UE is described. The method may include determining an uplink transmission configuration for a second UE, the uplink transmission configuration identifying one or more resources for uplink transmissions between the second UE and a base station, measuring an amount of interference associated with the one or more resources for uplink transmissions based on a sidelink communication link with the second UE, and transmitting, to one of the second UE or the base station, an interference measurement report including an indication of the measured amount of interference.

An apparatus for wireless communications at a first UE is described. The apparatus may include a processor, memory coupled with the processor, and instructions stored in the memory. The instructions may be executable by the processor to cause the apparatus to determine an uplink transmission configuration for a second UE, the uplink transmission configuration identifying one or more resources for uplink transmissions between the second UE and a base station, measure an amount of interference associated with the one or more resources for uplink transmissions based on a sidelink communication link with the second UE, and transmit, to one of the second UE or the base station, an interference measurement report including an indication of the measured amount of interference.

Another apparatus for wireless communications at a first UE is described. The apparatus may include means for determining an uplink transmission configuration for a second UE, the uplink transmission configuration identifying one or more resources for uplink transmissions between the second UE and a base station, means for measuring an amount of interference associated with the one or more resources for uplink transmissions based on a sidelink communication link with the second UE, and means for transmitting, to one of the second UE or the base station, an interference measurement report including an indication of the measured amount of interference.

A non-transitory computer-readable medium storing code for wireless communications at a first UE is described. The code may include instructions executable by a processor to determine an uplink transmission configuration for a second UE, the uplink transmission configuration identifying one or more resources for uplink transmissions between the second UE and a base station, measure an amount of interference associated with the one or more resources for uplink transmissions based on a sidelink communication link with the second UE, and transmit, to one of the second UE or the base station, an interference measurement report including an indication of the measured amount of interference.

In some examples of the method, apparatuses, and non-transitory computer-readable medium described herein, determining the uplink transmission configuration may include operations, features, means, or instructions for receiving an indication of the uplink transmission configuration from the second UE, where determining the uplink transmission configuration may be based on receiving the indication.

In some examples of the method, apparatuses, and non-transitory computer-readable medium described herein, determining the uplink transmission configuration may include operations, features, means, or instructions for receiving an indication of the uplink transmission configuration from the base station, where determining the uplink transmission configuration may be based on receiving the indication.

Some examples of the method, apparatuses, and non-transitory computer-readable medium described herein may further include operations, features, means, or instructions for determining one or more beam directions for receiving sidelink transmissions from the second UE, where measuring the amount of interference may be based on the determined one or more beam directions.

In some examples of the method, apparatuses, and non-transitory computer-readable medium described herein, measuring the amount of interference may include operations, features, means, or instructions for measuring an RSRP, an SNR, an RSSI, or any combination thereof, associated with the one or more resources for uplink transmissions.

Some examples of the method, apparatuses, and non-transitory computer-readable medium described herein may further include operations, features, means, or instructions for receiving, from the second UE, one or more sidelink messages based on transmitting the interference measurement report.

A method for wireless communications at a base station is described. The method may include determining a sidelink transmission configuration identifying one or more resources for sidelink transmissions between a first UE and a second UE, determining an amount of interference associated with the one or more resources for sidelink transmissions, and transmitting, to the first UE, a resource grant for one or more sidelink messages and one or more uplink messages, the one or more sidelink messages being concurrent with the one or more uplink messages, where transmitting the resource grant is based on the determined amount of interference.

An apparatus for wireless communications at a base station is described. The apparatus may include a processor, memory coupled with the processor, and instructions stored in the memory. The instructions may be executable by the processor to cause the apparatus to determine a sidelink transmission configuration identifying one or more resources for sidelink transmissions between a first UE and a second UE, determine an amount of interference associated with the one or more resources for sidelink transmissions, and transmit, to the first UE, a resource grant for one or more sidelink messages and one or more uplink messages, the one or more sidelink messages being concurrent with the one or more uplink messages, where transmitting the resource grant is based on the determined amount of interference.

Another apparatus for wireless communications at a base station is described. The apparatus may include means for determining a sidelink transmission configuration identifying one or more resources for sidelink transmissions between a first UE and a second UE, means for determining an amount of interference associated with the one or more resources for sidelink transmissions, and means for transmitting, to the first UE, a resource grant for one or more sidelink messages and one or more uplink messages, the one or more sidelink messages being concurrent with the one or more uplink messages, where transmitting the resource grant is based on the determined amount of interference.

A non-transitory computer-readable medium storing code for wireless communications at a base station is described. The code may include instructions executable by a processor to determine a sidelink transmission configuration identifying one or more resources for sidelink transmissions between a first UE and a second UE, determine an amount of interference associated with the one or more resources for sidelink transmissions, and transmit, to the first UE, a resource grant for one or more sidelink messages and one or more uplink messages, the one or more sidelink messages being concurrent with the one or more uplink messages, where transmitting the resource grant is based on the determined amount of interference.

In some examples of the method, apparatuses, and non-transitory computer-readable medium described herein, determining the sidelink transmission configuration may include operations, features, means, or instructions for receiving an indication of the sidelink transmission configuration from the first UE, where determining the sidelink transmission configuration may be based on receiving the indication.

In some examples of the method, apparatuses, and non-transitory computer-readable medium described herein, determining the sidelink transmission configuration may include operations, features, means, or instructions for receiving an indication of the sidelink transmission configuration from the second UE, where determining the sidelink transmission configuration may be based on receiving the indication.

In some examples of the method, apparatuses, and non-transitory computer-readable medium described herein, determining the amount of interference may include operations, features, means, or instructions for measuring the amount of interference associated with the one or more resources for sidelink transmissions, where transmitting the resource grant may be based on the measured amount of interference.

In some examples of the method, apparatuses, and non-transitory computer-readable medium described herein, measuring the amount of interference may include operations, features, means, or instructions for measuring an RSRP, an SNR, an RSSI, or any combination thereof, associated with the one or more resources for sidelink transmissions.

Some examples of the method, apparatuses, and non-transitory computer-readable medium described herein may further include operations, features, means, or instructions for determining the amount of interference satisfies a threshold amount of interference, where transmitting the resource grant may be based on the amount of interference satisfying the threshold amount of interference.

Some examples of the method, apparatuses, and non-transitory computer-readable medium described herein may further include operations, features, means, or instructions for transmitting a transmit power control message to the first UE, the transmit power control message instructing the first UE to adjust one or both of a transmit power associated with the one or more sidelink messages or a transmit power associated with the one or more uplink messages.

In some examples of the method, apparatuses, and non-transitory computer-readable medium described herein, a first TRP at the first UE and a second TRP at the first UE share a transmission power and the method, apparatuses, and non-transitory computer-readable medium may include further operations, features, means, or instructions for determining a maximum transmit power associated with the transmission power and determining a first amount to adjust the transmit power associated with the one or more sidelink messages and a second amount to adjust the transmit power associated with the one or more uplink messages, where the first amount and the second amount may be determined based on a downlink path loss, the amount of interference, and the maximum transmit power, and where the transmit power control message includes the first amount and the second amount.

In some examples of the method, apparatuses, and non-transitory computer-readable medium described herein, a first TRP at the first UE may be associated with a first transmission power and a second TRP at the first UE may be associated with a second transmission power and the method, apparatuses, and non-transitory computer-readable medium may include further operations, features, means, or instructions for determining a first amount to adjust the transmit power associated with the one or more sidelink messages and a second amount to adjust the transmit power associated with the one or more uplink messages, where the first amount and the second amount may be determined based on the amount of interference, and where the transmit power control message includes the first amount and the second amount.

Some examples of the method, apparatuses, and non-transitory computer-readable medium described herein may further include operations, features, means, or instructions for determining one or more beam directions for receiving uplink transmissions from the first UE, where measuring the amount of interference may be based on the determined one or more beam directions.

In some examples of the method, apparatuses, and non-transitory computer-readable medium described herein, the sidelink transmission configuration includes a configuration of one or more sidelink reference signals, a configuration of a sidelink channel, an ID associated with the second UE, an ID associated with a TRP at the first UE associated with sidelink transmissions, a precoder associated with the TRP, a transmit power associated with the sidelink transmissions between the first UE and the second UE, a MCS associated with sidelink transmissions between the first UE and the second UE, or any combination thereof.

Some examples of the method, apparatuses, and non-transitory computer-readable medium described herein may further include operations, features, means, or instructions for receiving, from the first UE, the one or more uplink messages based on transmitting the resource grant.

In some examples of the method, apparatuses, and non-transitory computer-readable medium described herein, the resource grant includes at least one of a configured grant or a dynamic grant.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
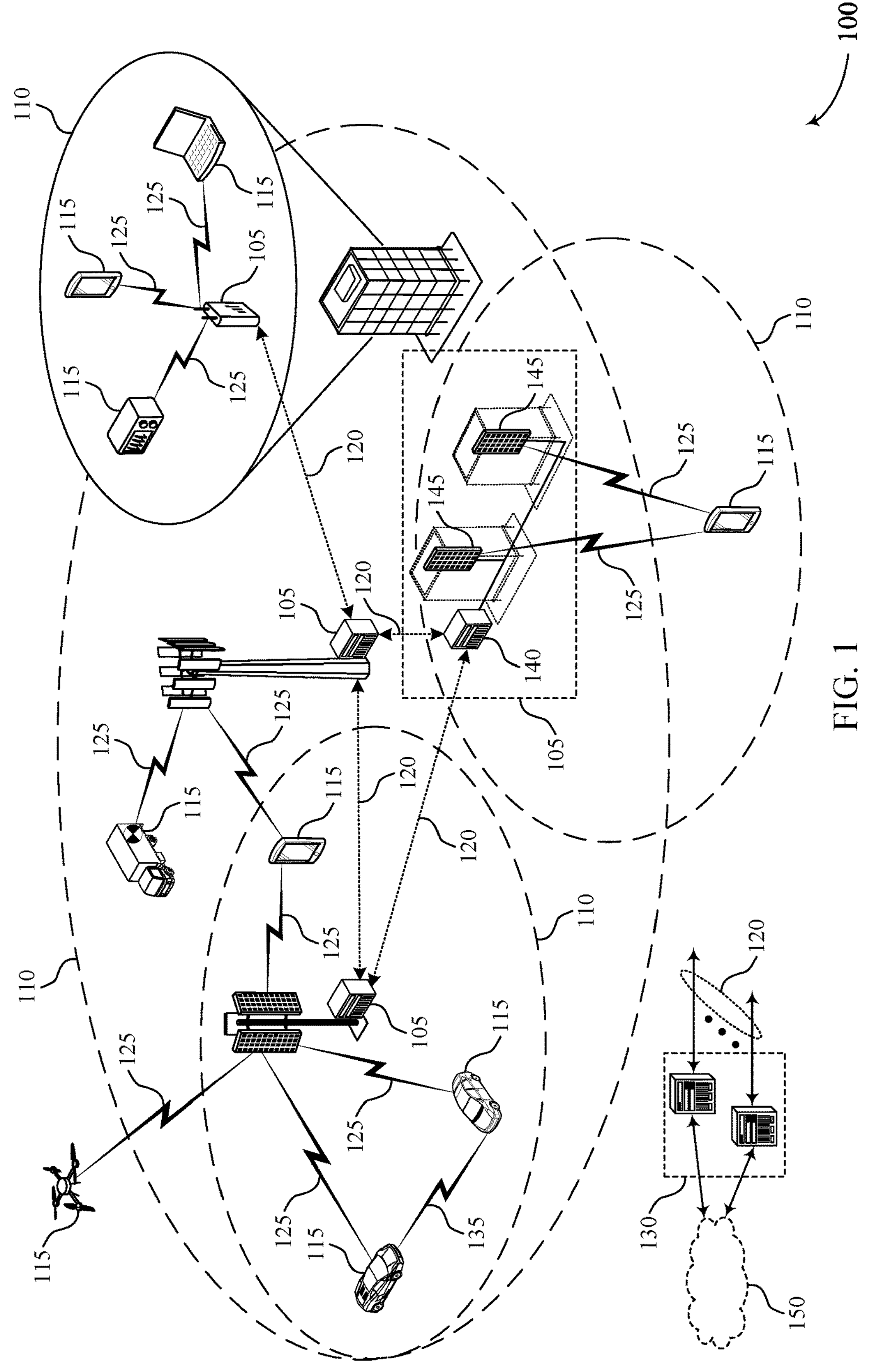
FIGS. 1 and 2 illustrate examples of wireless communications systems that supports techniques for full-duplex sidelink and uplink transmissions in accordance with aspects of the present disclosure.

Some wireless communication systems, such as fifth generation (5G) New Radio (NR) systems, support wireless devices establishing both an access link (e.g., a Uu interface) and a sidelink (e.g., a PC5 interface). For example, a user equipment (UE) may establish an access link with a base station and establish a sidelink (e.g., a sidelink communication link) with another UE. In some cases, a UE may establish an access link with a base station and may establish a sidelink with another UE which operates as a relay (e.g., which has an access link with the same or different base station as the UE) such that the UE may communicate with a network via either the access link, or the sidelink, or both. In some cases, devices may use a sidelink to extend a coverage area. For example, a UE may establish a sidelink with another UE (e.g., a relay UE) having an access link with a base station for which the UE is out of coverage. Sidelink communications may be referred to as vehicle-to-vehicle (V2V) communications, vehicle-to-everything (V2X) communications, device-to-device (D2D) communications, or other terminology. In some examples, the UE may allocate resources for sidelink communications via a resource grant from a base station or autonomously allocate resources for sidelink communications using a sidelink sensing procedure.

Some wireless communications systems, such as those supporting sidelink communications, may support devices having multiple transmission reception points (TRPs). For example, the UE may include two or more TRPs separated by a distance and may transmit two or more signals simultaneously (e.g., in a same time interval, such as a slot) using the different TRPs. As such, the UE may be capable of operating in a full-duplex mode. Using other techniques, a UE capable of full-duplex may not transmit simultaneous sidelink and uplink signals. Instead, if the UE is scheduled to transmit an uplink signal and a sidelink signal in the same slot, the UE may drop the signal (either the uplink signal or the sidelink signal) associated with a lower priority in an effort to avoid possible interference between the uplink signal and the sidelink signal. But when interference is minimal (e.g., below some threshold, satisfying some threshold) and communication is possible, dropping the signal associated with a lower priority may result in an underutilization of resources.

In some examples, a base station may schedule a first UE (e.g., a sidelink transmitting UE, a multi-TRP (mTRP) UE) for concurrent sidelink and uplink transmissions based on a measured amount of interference or other information. That is, the base station may determine that the measured amount of interference associated with resources the first UE may use for sidelink or uplink communications is below a threshold and transmit a resource grant to the first UE scheduling one or more sidelink transmissions to a second UE and one or more uplink transmissions to the base station in the same slot.

In some examples, the base station may have information regarding a set of resources the first UE may use for sidelink communications and may measure the amount of interference using an uplink receive beam direction. In another example, the base station may not have the information regarding the set of resources the first UE may use for sidelink communications. In such example, the base station may receive a sidelink transmission configuration indicating the set of resources the first UE may use for sidelink communications and measure the amount of interference based on the sidelink transmission configuration using its uplink receive beam direction.

Additionally or alternatively, the second UE may measure the amount of interference using an uplink transmission configuration received from the first UE or the base station that indicates a set of resources the first UE may utilize for uplink communications and transmit an indication of the measured amount of interference to the base station. Along with the resource grant, the base station may transmit a transmit power control message. The transmit power control message may instruct the first UE to adjust the transmit power for the one or more uplink messages and the one or more sidelink messages scheduled by the resource grant, where the adjustment is based on the measured amount of interference among other measurement criteria. By scheduling an mTRP UE for concurrent sidelink and uplink transmissions (e.g., full-duplex communications)) based on a measured amount of interference, interference may be avoided and an efficient utilization of resources in the system may be achieved.

Aspects of the disclosure are initially described in the context of wireless communications systems. Additional aspects are described in the context of process flows. Aspects of the disclosure are further illustrated by and described with reference to apparatus diagrams, system diagrams, and flowcharts that relate to techniques for full-duplex sidelink and uplink transmissions.

FIG. 1 illustrates an example of a wireless communications system 100 that supports techniques for full-duplex sidelink and uplink transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a base station 105 may schedule an mTRP UE 115 for concurrent uplink and sidelink transmissions (e.g., full-duplex communications) based on interference information. For example, a first UE 115 and a second UE 115 may communicate over a sidelink communication link, and the first UE may provide the second UE 115 with transmission configuration information (e.g., an uplink transmission configuration) associated with a communication link (e.g., an access link) between the first UE 115 and a base station 105. Based on the transmission configuration information from the first UE 115, the second UE may perform one or more measurements to identify interference on the sidelink communication link based on uplink transmissions from the first UE 115 to the base station 105. In such cases, the second UE 115 may perform the measurements on a directional beam (e.g., a receive beam) that the second UE 115 intends to use (or is using) for sidelink communications with the first UE 115, which may be based on the transmission configuration information provided by the first UE 115. Upon performing the measurements, the second UE 115 may report the measurement results (e.g., directly to the base station or to the first UE 115).

The base station 105, in turn, may determine whether full-duplex communications may be supported by the first UE 115 based on the measurement results. For example, the base station 105 may determine an amount of interference associated with resources the first UE 115 may utilize for sidelink or uplink transmissions. Here, the base station 105 may perform its own measurements of signals transmitted over the sidelink (e.g., between the first UE 115 and the second UE 115) to determine an amount of interference on uplink signals from the first UE 115. In any case, if the determined amount of interference is below a threshold, the base station 105 may determine simultaneous transmissions are possible for the first UE 115 and transmit a resource grant to the first UE 115 granting resources for simultaneous transmission of one or more sidelink messages and one or more uplink messages, where the resources at least partially overlap in time.

Figure 2:
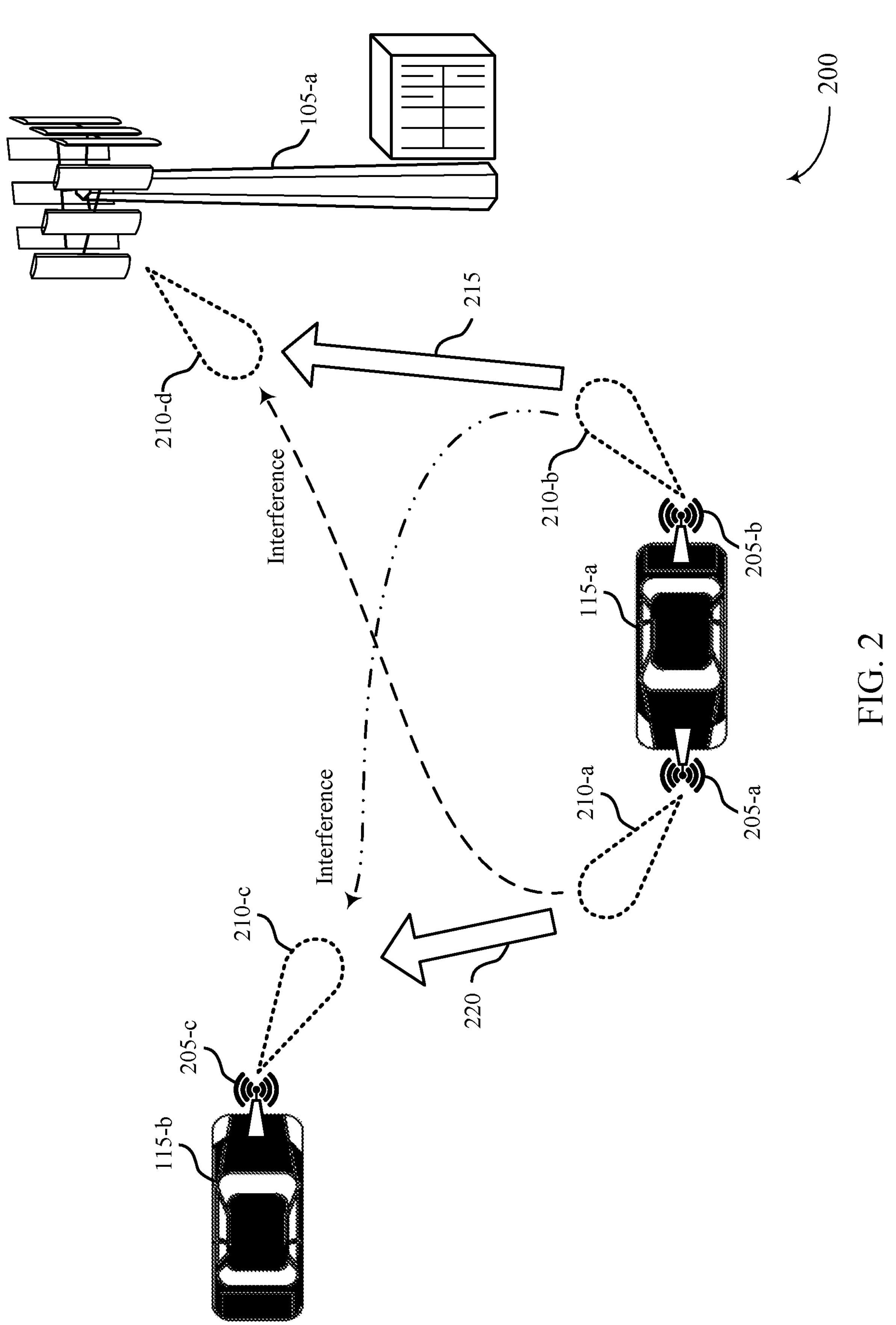

FIG. 2 illustrates an example of a wireless communications system 200 that supports techniques for full-duplex sidelink and uplink transmissions in accordance with aspects of the present disclosure. In some examples, the wireless communications system 200 may implement aspects of a wireless communications system 100. For example, the wireless communications system 200 may include a UE 115-*a*, a UE 115-*b*, and a base station 105-*a* which may be examples of a UE 115 and a base station 105 with reference to FIG. 1. The UE 115-*a* and the UE 115-*b* may be examples of vehicle UEs (VUEs) or any other type of wireless device.

In some examples, the wireless communications system 200 may support sidelink communications (e.g., communication between two or more wireless devices). For example, the UE 115-*a* may establish a sidelink communication link with the UE 115-*b* and transmit signals to or receive signals from the UE 115-*b*. The UE 115-*a* and the UE 115-*b* may allocate resources for sidelink communications one of two ways. One way is that the UE 115-*a* or the UE 115-*b* may transmit a sidelink scheduling request (SR) requesting resources (e.g., time and frequency resources) for a sidelink transmission as well as a sidelink buffer status report (BSR) indicating a buffer size associated with the sidelink transmission to the base station 105-*a*. In addition to the buffer size, the BSR may also indicate a destination index (e.g., SL-DestinationIdentity) that identifies the sidelink transmission destination and a logical channel group identifier (ID) that identifies a group of logical channels whose sidelink buffer status is being reported. Upon receiving the sidelink SR and the sidelink BSR, the base station 105-*a* may transmit a sidelink grant scheduling the sidelink transmission. Alternatively, the UE 115-*a* or the UE 115-*b* may autonomously select resources (e.g., time and frequency resources) for the sidelink transmission using a sidelink sensing procedure (e.g., full-sensing or partial sensing). That is, the UE 115-*a* or the UE 115-*b* may schedule sidelink transmissions without a sidelink grant from the base station 105-*a*.

Some wireless devices of the of the wireless communications system 200 may include multiple TRPs 205. For example, the UE 115-*a* may be an example of an mTRP UE that includes a TRP 205-*a* and a TRP 205-*b*. In some examples, the UE 115-*b* may include a single TRP 205-*c* or multiple TRPs 205. The TRP 205-*a* and the TRP 205-*b* may perform separate radio-frequency (RF) and digital processing, but may share a common controller (e.g., software or hardware controller). The TRP 205-*a* and the TRP 205-*b* may be separated by some distance (e.g., three to four meters). This distance may allow each TRP 205 (e.g., TRP 205-*a* and TRP 205-*b*) to view the channel differently and as such, the UE 115-*a* may utilize spatial domain multiplexing (SDM) when transmitting signals to or receiving signals from other wireless devices (e.g., UE 115-*b*) or the base station 105-*a*. For example, SDM may allow the UE 115-*a* to transmit or receive signals via the TRP 205-*a* concurrent to (e.g., using the same time resources) receiving or transmitting signals via the TRP 205-*b*. That is, the UE 115-*a* may be capable of receiving a downlink signal from the base station 105-*b* via TRP 205-*b* concurrent to the transmitting a sidelink signal to the UE 115-*b* via TRP 205-*a*. In another example, the UE 115-*a* may be capable of transmitting an uplink signal to the base station 105-*a* via TRP 205-*b* concurrent to transmitting a sidelink signals to the UE 115-*b* via TRP 205-*a*. However, using different techniques, a UE 115-*a* scheduled for concurrent uplink/downlink and sidelink transmissions may drop the transmission with a lower priority as to avoid interference even if an amount of interference associated with the concurrent transmissions is relatively low (e.g., below a threshold). As such, system resources may be underutilized in the event that concurrent transmissions are feasible.

As described herein, the base station 105-*b* may schedule concurrent uplink and sidelink transmissions for an mTRP (e.g., UE 115-*a*) based on a measured amount of interference associated with the concurrent uplink and sidelink transmissions. For example, the UE 115-*a* may establish a communication link 215 with the base station 105-*a* and a sidelink communication link 220 with the UE 115-*b*. During link establishment, the UE 115-*a* may undergo beam management operations. The beam management operations may allow the UE 115-*a* to select a beam pair to use for communication with the UE 115-*b* and a beam pair to use for communication with the base station 105-*b*. For example, the UE 115-*a* may utilize a directional beam 210-*a* to transmit sidelink signals to the UE 115-*b* over the sidelink communication link 220 and the UE 115-*b* may utilize a directional beam 210-*c* to receive the sidelink signals from the UE 115-*a* over the sidelink communication link 220. Similarly, the UE 115-*a* may utilize a directional beam 210-*b* to transmit an uplink signal to the base station 105-*a* over communication link 215 and the base station 105-*a* may utilize a directional beam 210-*d* to receive an uplink signal from the UE 115-*a* over communication link 215. In some examples, the base station 105-*a* may transmit a resource grant (e.g., scheduling one or more time/frequency resources) to the UE 115-*a* indicating resources the UE 115-*a* may utilize to transmit one or more sidelink signals to the UE 115-*b* via the TRP 205-*a* and resources the UE 115-*a* may utilize to transmit one or more sidelink signals to the base station 105-*a* via TRP 205-*b*, where the resources for the one or more sidelink signals and the resources for the one or more uplink signals are located, for example, within a same slot or other time period.

In some examples, the base station 105-*a* may transmit the resource grant to the UE 115-*a* based on a measured amount of interference. For example, the base station 105-*a* may have knowledge of resources the UE 115-*a* may use for sidelink communications with the UE 115-*b* (e.g., when the base station 105-*a* schedules the UE 115-*a* for sidelink communications) and may measure an amount of interference between resources used for sidelink communications between the UE 115-*b* and the UE 115-*a* and resources used for uplink communications between the base station 105-*a* and the UE 115-*a*. Alternatively, the base station 105-*a* may not have knowledge of resources the UE 115-*a* may use for sidelink communications with the UE 115-*b* (e.g., when the UE 115-*a* autonomously allocates resources for sidelink communications or in other examples). In such examples, the UE 115-*a* may transmit a sidelink transmission configuration to the base station 105-*a*. The sidelink transmission configuration may include information such as a configuration associated with a sidelink signal (e.g., sidelink reference signal), a configuration associated with a sidelink channel (e.g., sidelink control channel, data channel, or feedback channel), an ID associated with TRP 205-*c*, a precoder associated with the TRP 205-*c*, a transmit power associated with sidelink communications between the UE 115-*a* and the UE 115-*b*, or a modulation and coding scheme (MCS) associated with sidelink communications between the UE 115-*a* and the UE 115-*b*. Using the sidelink transmission configuration, the base station 105-*b* may measure an amount of interference. Specifically, the base station 105-*b* may perform interference measurement using a beam direction associated with the directional beam 210-*d* as to capture the interference which occurs during concurrent transmission of sidelink and uplink transmissions.

Alternatively, the UE 115-*b* may perform interference measurements and report the interference measurements to the base station 105-*a*. For example, the UE 115-*a* may transmit an uplink transmission configuration to the UE 115-*b* including information such as an indication of resources that the UE 115-*a* may use for uplink transmissions to the base station 105-*a*. Using the uplink transmission configuration, UE 115-*b* may measure an amount of interference associated with resources the UE 115-*a* may use for uplink transmissions to the base station 105-*a*. Specifically, the UE 115-*b* may perform interference measurements using a beam direction associated with directional beam 210-*c*. The UE 115-*b* may then provide this interference measurement information directly to the base station 105-*a* or use UE 115-*a* as a relay. The measured amount of interference may correspond to a measured reference signal received power (RSRP), a measured received signal strength indicator (RSSI), or a measured SNR. If the measured amount of interference is below a threshold, the base station 105-*b* may determine that concurrent sidelink and uplink transmissions are possible and may transmit the resource grant to the UE 115-*a*. Alternatively, if the measured amount of interference is above a threshold, the base station 105-*a* may determine concurrent sidelink and uplink transmissions are not possible and refrain from transmitting the resource grant to the UE 115-*a*. If the UE 115-*a* receives the resource grant from the base station 105-*a*, the UE 115-*a* may transmit one or more sidelink signals to the UE 115-*b* using TRP 205-*a* and one or more uplink signals to the base station 105-*a* using TRP 205-*b* using resources in the same slot which are indicated in the resource grant.

In some examples, the UE 115-*a* may adjust transmit powers for transmitting concurrent uplink and sidelink signals based on a transmit power control message from the base station 105-*a*. For example, the base station may determine an amount of interference associated with resources the UE 115-*a* may use for sidelink/uplink transmissions. In addition, the base station 105-*a* may determine a downlink path loss. The downlink path loss may be determined by measuring a signal strength of a downlink signal (e.g., reference signal) at the UE 115-*a*. In some examples, the TRP 205-*a* and the TRP 205-*b* may share transmission power. That is, the TRP 205-*a* and the TRP 205-*b* may be subject to a maximum power limit. The base station 105-*a* may determine a first transmit power for one or more uplink signals and a second transmit power for one or more sidelink signals. In one example, the base station 105-*a* may determine the first transmit power and the second transmit power such that the received power from uplink signals at the base station 105-*a* meets a power control target (based on the downlink pathloss) while the received power of sidelink signals at the base station 105-*a* is below a threshold (interference is below a threshold).

In another example, the base station 105-*a* may determine the first transmit power and the second transmit power such that the combination of the received power of uplink signals and the received power of sidelink signals at the base station 105-*a* meet a power control target (based on the downlink pathloss). That is, the base station 105-*a* may determine a transmission power based on the downlink pathloss and split the transmission power between the first transmit power and the second transmit power based on a received power level of uplink signals and interference. In either example, a combination of the first transmit power and the second transmit power may be less than or equal to the maximum power limit. In some examples, the TRP 205-*a* and the TRP 205-*b* may not share a transmission power. As such, the TRP 205-*a* and the TRP 205-*b* may have its own maximum power limit and power control may be performed separately. Once determined, the base station 105-*a* may transmit an indication of the first transmit power and the second transmit power to the UE 115-*a* via a transmit power control message. Using the transmit power control message along with the grant, the UE 115-*a* may transmit one or more uplink signals using the first transmit power via TRP 205-*b* to base station 105-*a* and transmit one or more uplink signals using the second transmit power via TRP 205-*a* to UE 115-*b*.

Figure 3:
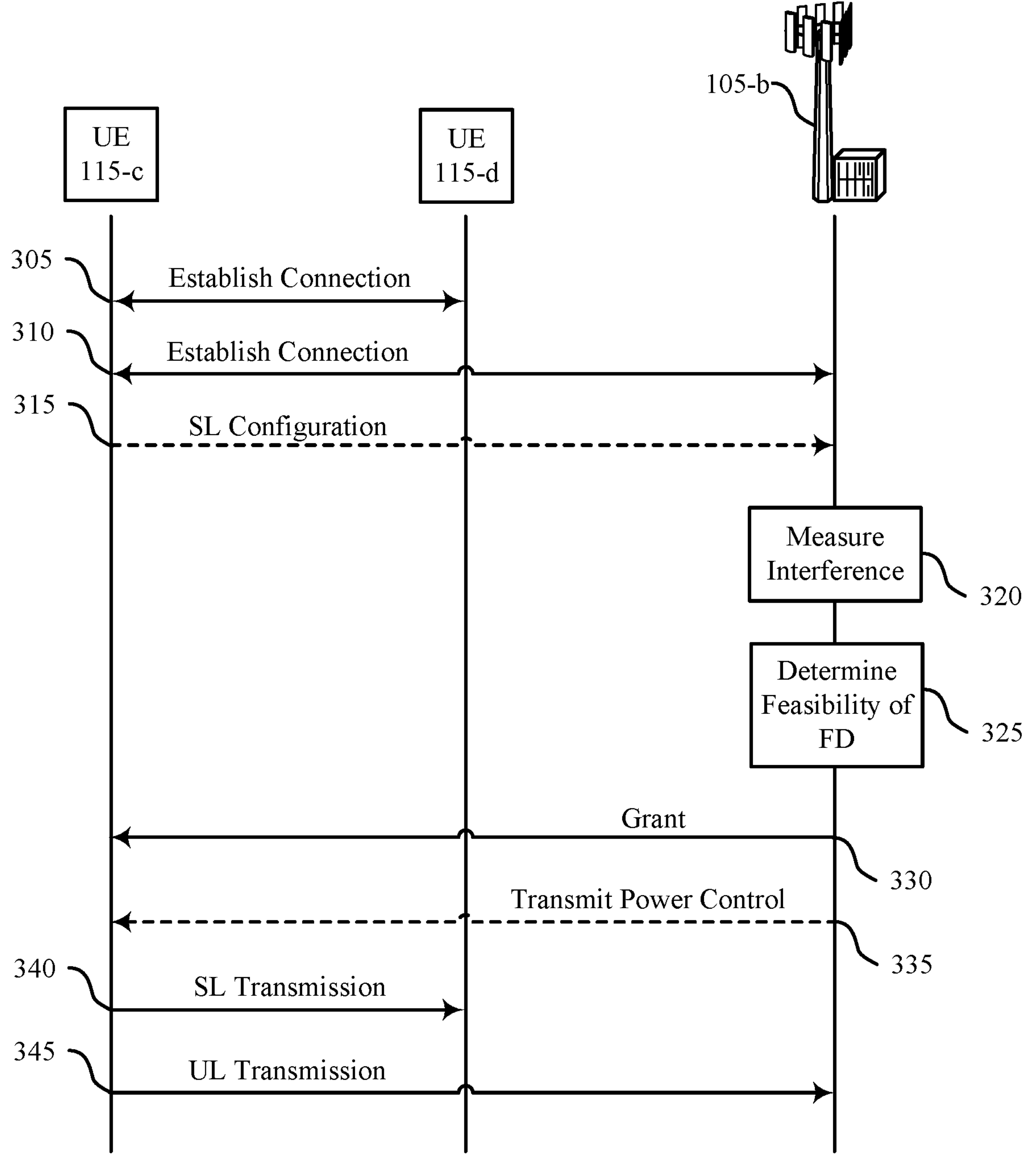
FIGS. 3 and 4 illustrate examples of process flows that supports techniques for full-duplex sidelink and uplink transmissions in accordance with aspects of the present disclosure.

FIG. 3 illustrates an example of a process flow 300 that supports techniques for full-duplex sidelink and uplink transmissions in accordance with aspects of the present disclosure. In some examples, the process flow 300 may implement or may be implemented by aspects of a wireless communications system 100 and a wireless communications system 200. The process flow 300 may involve a base station 105-*b* measuring interference and scheduling a UE 115-*c* for concurrent uplink and sidelink transmissions based on the measured interference. Alternative examples of the following may be implemented, where some steps are performed in a different order than described or are not performed at all. In some cases, steps may include additional features not mentioned below, or further steps may be added.

At 305, the UE 115-*c* may establish a sidelink communication link with the UE 115-*d*. During the link establishment procedure, the UE 115-*c* may also select or identify a beam pair for sidelink communications. That is, a directional beam at the UE 115-*c* for transmitting sidelink signals to the UE 115-*d* and a directional beam at the UE 115-*d* for receiving sidelink signals from the UE 115-*c*. Similarly, at 310, the UE 115-*c* may establish a communication link with the base station 105-*b*. During the link establishment procedure, the UE 115-*c* may also select or identify a beam pair for uplink communications. That is, a directional beam at the UE 115-*c* for transmitting uplink signals to the base station 105-*b* and a directional beam at the base station 105-*b* for receiving uplink signals from the UE 115-*c*. In some example, the UE 115-*c* may include multiple TRPs. For example, the UE 115-*c* may include a first TRP associated with the sidelink communication link and a second TRP associated with the communication link.

At 315, the UE 115-*c* may optionally transmit a sidelink transmission configuration to the base station 105-*b*. In some cases, the UE 115-*c* may transmit the sidelink transmission configuration to the base station 105-*b* if the base station 105-*d* does not have knowledge of the resources the UE 115-*c* may use to transmit sidelink signals to the UE 115-*d*, for example, if the UE 115-*c* autonomously schedules sidelink transmissions to the UE 115-*d* using sidelink sensing procedures. The sidelink transmission configuration may include an indication of one or more resources the UE 115-*c* may use for sidelink communications. For example, the sidelink transmission configuration may include a configuration of a sidelink reference signal that the UE 115-*c* may use during sidelink communications, a configuration of a sidelink channel the UE 115-*c* may use to transmit or receive sidelink signals, an ID associated with the first TRP, a precoder associated with the first TRP, a transmit power used by the UE 115-*c* to transmit sidelink signals, a MCS used by the UE 115-*c* when transmitting sidelink signals, etc. The UE 115-*c* may signal the sidelink transmission configuration to the base station 105-*b* via radio resource control (RRC) signaling or medium access control (MAC) control element (CE). In some examples, if the base station has knowledge of resources the UE 115-*c* may use to transmit sidelink signals to the UE 115-*d*, for example, if the base station 105-*c* schedules the sidelink communications for the UE 115-*c* using a sidelink grant, the base station 105-*b* may not receive the sidelink transmission configuration.

At 320, the base station 105-*b* may measure interference. For example, the base station 105-*b* may measure an amount of interference associated with the one or more resources the UE 115-*c* may use for sidelink communications. In some examples, the base station 105-*b* may utilize a beam direction associated with the directional beam for receiving uplink signals from the UE 115-*c* in order to measure the interference that may occur during concurrent sidelink and uplink transmissions. Measuring interference may include measuring RSRP or SNR (or reference signal received quality (RSRQ)) of one or more sidelink signals transmitted by the UE 115-*c* or measuring RSSI of one or more resources that the UE 115-*c* may use for sidelink signals.

At 325, the base station 105-*b* may determine the feasibility of concurrent sidelink and uplink transmissions for the UE 115-*c*. For example, if the base station 105-*b* determines the measured amount of interference is below a threshold, concurrent sidelink and uplink transmissions may be possible. Alternatively, if the base station 105-*b* determines the measured amount of interference is above a threshold, concurrent sidelink and uplink transmissions may not be possible.

In some examples, the base station 105-*b* may also determine a first transmit power the UE 115-*c* may use for transmitting one or more sidelink signals to the UE 115-*d* and a second transmit power the UE 115-*c* may use for transmitting one or more uplink signals to the base station 105-*b*. The first TRP and the second TRP at the UE 115-*c* may share a power source. In such example, the base station 105-*b* may determine the first transmit power and the second transmit power based on a downlink pathloss and the measured amount of interference, where a combination of the first transmit power and the second transmit is equal to or less than a maximum power limit associated with the shared power source. Alternatively, the first TRP and the second TRP may not share a power source and the first transmit power and the second transmit power may be determined separately based on the measured amount of interference.

At 330, the base station 105-*b* may transmit a resource grant to the UE 115-*c*. In some examples, the resource grant may schedule concurrent sidelink and uplink transmissions at the UE 115-*c*. For example, the resource grant may include an indication of a first set of resources the UE 115-*c* may use to transmit one or more sidelink signals to the UE 115-*d* and an indication of a second set of resources the UE 115-*c* may use to transmit one or more uplink signals to the base station 105-*b*, where the first set of resources are located in the same slot as the second set of resources. In some examples, the first set of resources and the second set of resources may at least partially overlap in frequency. Alternatively, the first set of resources and the second set of resources may not overlap in frequency. In some examples, the base station 105-*b* may transmit the resource grant to the UE 115-*c* if the concurrent sidelink and uplink transmission were determined feasible at 325.

At 335, the base station 105-*b* may potentially transmit a transmit power control message to the UE 115-*c*. The transmit power control message may instruct the UE 115-*c* to adjust a transmit power for transmitting one or more sidelink signals to the UE 115-*d* and a transmit power for transmitting one or more uplink signals to the base station 105-*b*. For example, the transmit power control message may include an indication of the first transmit power and the second transmit power determined at 325 and the UE 115-*c* may adjust its transmit powers accordingly.

At 340, the UE 115-*c* may transmit one or more sidelink signals to the UE 115-*d* via the first TRP based on the grant received at 330. In some example, the UE 115-*c* may use the first transmit power to transmit the one or more sidelink signals to the UE 115-*d*. Similarity, at 345, the UE 115-*c* may transmit one or more uplink signals to the base station 105-*b* via the second TRP based on the grant received at 330. In some example, the UE 115-*c* may use the second transmit power to transmit the one or more uplink signals to the base station 105-*b*.

Figure 4:
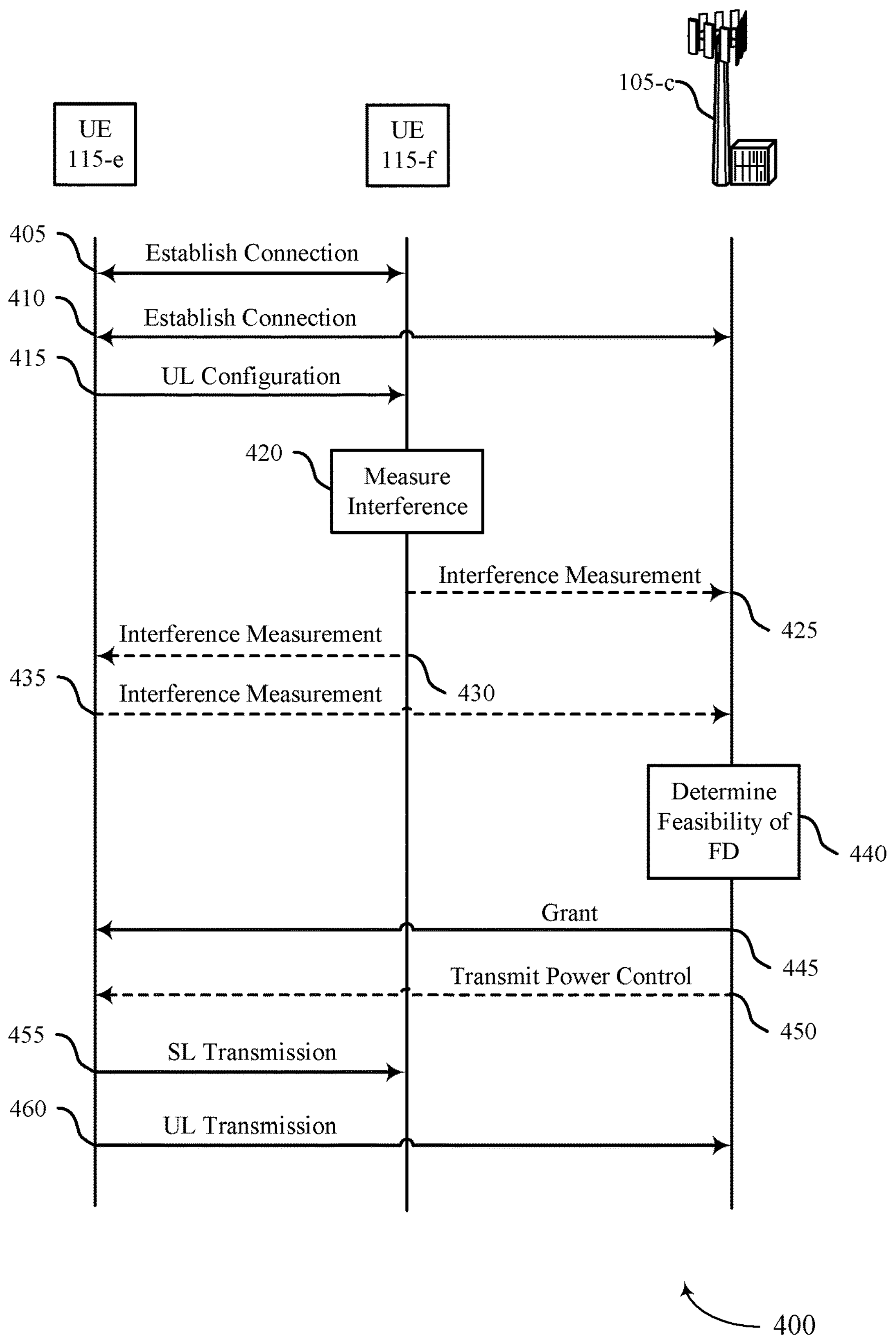

FIG. 4 illustrates an example of a process flow 400 that supports techniques for full-duplex sidelink and uplink transmissions in accordance with aspects of the present disclosure. In some examples, the process flow 400 may implement or may be implemented by aspects of a wireless communications system 100, a wireless communications system 200, and a process flow 300. The process flow 400 may involve a UE 115-*f* measuring interference and transmitting interference information to a base station 105-*c*, where the base station 105-*c* may use the interference information to schedule a UE 115-*e* for concurrent uplink and sidelink transmissions via different TRPs. Alternative examples of the following may be implemented, where some steps are performed in a different order than described or are not performed at all. In some cases, steps may include additional features not mentioned below, or further steps may be added.

At 405, the UE 115-*e* may establish a sidelink communication link with the UE 115-*f*. During the link establishment procedure, the UE 115-*e* may also select or identify a beam pair for sidelink communications. That is, a directional beam at the UE 115-*e* for transmitting sidelink signals to the UE 115-*f* and a directional beam at the UE 115-*f* for receiving sidelink signals from the UE 115-*e*. Similarly, at 410, the UE 115-*e* may establish a communication link with the base station 105-*c*. During the link establishment procedure, the UE 115-*e* may also select or identify a beam pair for uplink communications. That is, a directional beam at the UE 115-*e* for transmitting uplink signals to the base station 105-*c* and a directional beam at the base station 105-*c* for receiving uplink signals from the UE 115-*e*. In some examples, the UE 115-*e* may include multiple TRPs. For example, the UE 115-*e* may include a first TRP associated with the sidelink communication link and a second TRP associated with the communication link.

At 415, the UE 115-*e* may transmit an uplink transmission configuration to the UE 115-*f*. The uplink transmission configuration may include an indication of one or more resources the UE 115-*e* may use for uplink communications. That is, one or more resources granted to the UE 115-*e* for uplink transmissions via a configured or dynamic resource grant from the base station 105-*c*.

Alternatively, the UE 115-*f* may receive the uplink transmission configuration from the base station 105-*c*. For example, the UE 115-*e* may provide the base station 105-*c* with information associated with the UE 115-*f* (e.g., destination ID of the UE 115-*f* or ID of the UE 115-*f*) and the base station 105-*c* may use this information to transmit the uplink transmission configuration to the UE 115-*f*. In some examples, information associated with the UE 115-*f* may be transmitted to the base station 105-*c* as part of a BSR. The base station 105-*c* may transmit the uplink transmission configuration during or after scheduling an uplink transmission for the UE 115-*e* such that the UE 115-*f* may measure interference of the scheduled uplink transmission.

At 420, the UE 115-*f* may measure interference. For example, the UE 115-*f* may measure an amount of interference associated with the one or more resources the UE 115-*e* may use for uplink communications. In some example, the UE 115-*f* may utilize a beam direction associated with the directional beam for receiving sidelink signals from the UE 115-*e* in order to measure the interference that may occur during concurrent sidelink and uplink transmissions. Measuring interference may include measuring RSRP or SNR (RSRQ) of one or more uplink signals transmitted by the UE 115-*e* or measuring RSSI of one or more resources that the UE 115-*e* uses for uplink signals.

In one case, at 425, the UE 115-*f* may report the interference measured at 420 to the base station 105-*c* directly. In another case, at 430, the UE 115-*f* may report the measured interference to the UE 115-*e* and the UE 115-*e* may forward the measured interference to the base station 105-*c* at 435. That is, the UE 115-*e* make act as relay between the UE 115-*f* and the base station 105-*c*.

At 440, the base station 105-*c* may determine the feasibility of concurrent sidelink and uplink transmissions for the UE 115-*e*. For example, if the base station 105-*c* determines the measured amount of interference received at 425 or 435 is below a threshold, concurrent sidelink and uplink transmissions may be possible. Alternatively, if the base station 105-*c* determines the measured amount of interference received at 425 or 435 is above a threshold, concurrent sidelink and uplink transmissions may not be possible.

In some examples, the base station 105-*c* may also determine a first transmit power the UE 115-*e* may use for transmitting one or more sidelink signals to the UE 115-*f* and a second transmit power the UE 115-*e* may use for transmitting one or more uplink signals to the base station 105-*c*. The first TRP and the second TRP at the UE 115-*e* may share a power source. In such example, the base station 105-*c* may determine the first transmit power and the second transmit power based on a downlink pathloss and the measured amount of interference, where a combination of the first transmit power and the second transmit is equal to or less than a maximum power limit associated with the shared power source. Alternatively, the first TRP and the second TRP may not share a power source and the first transmit power and the second transmit power may be determined separately based on the measured amount of interference.

At 445, the base station 105-*c* may transmit a resource grant to the UE 115-*e*. In some examples, the resource grant may schedule concurrent sidelink and uplink transmissions at the UE 115-*e*. For example, the resource grant may include an indication of a first set of resources the UE 115-*e* may use to transmit one or more sidelink signals to the UE 115-*f* and an indication of a second set of resources the UE 115-*e* may use to transmit one or more uplink signals to the base station 105-*c*, where the first set of resources are located in the same slot as the second set of resources. In some examples, the first set of resources and the second set of resources may at least partially overlap in frequency. Alternatively, the first set of resources and the second set of resources may not overlap in frequency. In some example, the base station 105-*c* may transmit the resource grant to the UE 115-*e* if the concurrent sidelink and uplink transmission were determined feasible at 440.

At 450, the base station 105-*c* may potentially transmit a transmit power control message to the UE 115-*c*. The transmit power control message may instruct the UE 115-*e* to adjust a transmit power for transmitting one or more sidelink signals to the UE 115-*f* and a transmit power for transmitting one or more uplink signals to the base station 105-*c*. For example, the transmit power control message may include an indication of the first transmit power and the second transmit power determined at 440 and the UE 115-*e* may adjust its transmit powers according to the first transmit and the second transmit powers.

At 455, the UE 115-*e* may transmit one or more sidelink signals to the UE 115-*f* via the first TRP based on the grant received at 445. In some example, the UE 115-*e* may use the first transmit power to transmit the one or more sidelink signals to the UE 115-*f* Similarity, at 460, the UE 115-*e* may transmit one or more uplink signals to the base station 105-*c* via the second TRP based on the grant received at 445. In some example, the UE 115-*e* may use the second transmit power to transmit the one or more uplink signals to the base station 105-*c*.

Figure 5:
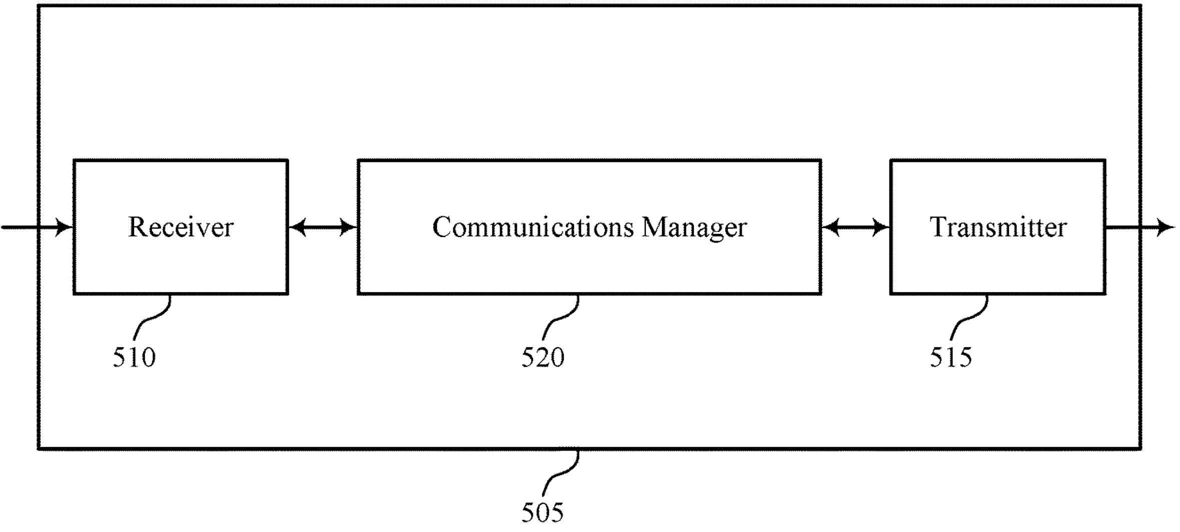
FIGS. 5 and 6 show block diagrams of devices that support techniques for full-duplex sidelink and uplink transmissions in accordance with aspects of the present disclosure.

FIG. 5 shows a block diagram 500 of a device 505 that supports techniques for full-duplex sidelink and uplink transmissions in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for full-duplex sidelink and uplink transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for full-duplex sidelink and uplink transmissions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for full-duplex sidelink and uplink transmissions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for establishing a first communication link with a base station and a sidelink communication link with a second UE. The communications manager 520 may be configured as or otherwise support a means for transmitting an indication of an uplink transmission configuration associated with the first communication link to the second UE, the uplink transmission configuration identifying one or more resources for uplink transmissions between the first UE and the base station. The communications manager 520 may be configured as or otherwise support a means for receiving, from the base station, a resource grant for one or more uplink messages over the first communication link and one or more sidelink messages over the sidelink communication link, the one or more uplink messages being concurrent with the one or more sidelink messages, where the resource grant is received based on an amount of interference associated with the one or more resources for uplink transmissions. The communications manager 520 may be configured as or otherwise support a means for transmitting the one or more sidelink messages to the first UE over the sidelink communication link and the one or more uplink messages to the base station over the first communication link based on receiving the resource grant.

Additionally or alternatively, the communications manager 520 may support wireless communications at a first UE in accordance with examples as disclosed herein. For example, the communications manager 520 may be configured as or otherwise support a means for determining an uplink transmission configuration for a second UE, the uplink transmission configuration identifying one or more resources for uplink transmissions between the second UE and a base station. The communications manager 520 may be configured as or otherwise support a means for measuring an amount of interference associated with the one or more resources for uplink transmissions based on a sidelink communication link with the second UE. The communications manager 520 may be configured as or otherwise support a means for transmitting, to one of the second UE or the base station, an interference measurement report including an indication of the measured amount of interference.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption and more efficient utilization of communication resources. For example, by performing concurrent uplink and sidelink transmissions based on interference measurements, the device 505 may utilize resources more efficiently compared to a UE which drops one of the uplink transmission or the sidelink transmission.

Figure 6:
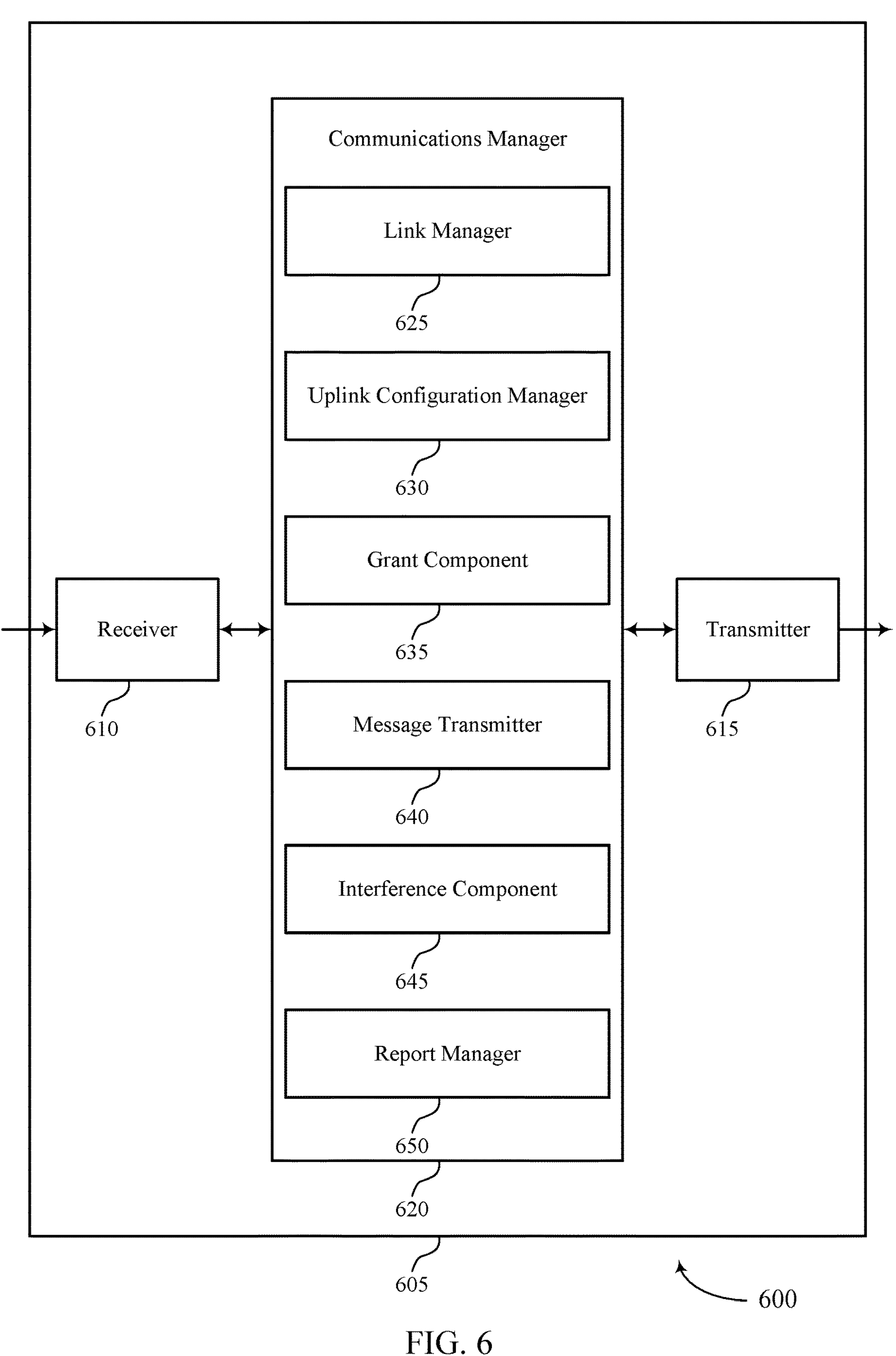

FIG. 6 shows a block diagram 600 of a device 605 that supports techniques for full-duplex sidelink and uplink transmissions in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for full-duplex sidelink and uplink transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for full-duplex sidelink and uplink transmissions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for full-duplex sidelink and uplink transmissions as described herein. For example, the communications manager 620 may include a link manager 625, an uplink configuration manager 630, a grant component 635, a message transmitter 640, an interference component 645, a report manager 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The link manager 625 may be configured as or otherwise support a means for establishing a first communication link with a base station and a sidelink communication link with a second UE. The uplink configuration manager 630 may be configured as or otherwise support a means for transmitting an indication of an uplink transmission configuration associated with the first communication link to the second UE, the uplink transmission configuration identifying one or more resources for uplink transmissions between the first UE and the base station. The grant component 635 may be configured as or otherwise support a means for receiving, from the base station, a resource grant for one or more uplink messages over the first communication link and one or more sidelink messages over the sidelink communication link, the one or more uplink messages being concurrent with the one or more sidelink messages, where the resource grant is received based on an amount of interference associated with the one or more resources for uplink transmissions. The message transmitter 640 may be configured as or otherwise support a means for transmitting the one or more sidelink messages to the first UE over the sidelink communication link and the one or more uplink messages to the base station over the first communication link based on receiving the resource grant.

Additionally or alternatively, the communications manager 620 may support wireless communications at a first UE in accordance with examples as disclosed herein. The uplink configuration manager 630 may be configured as or otherwise support a means for determining an uplink transmission configuration for a second UE, the uplink transmission configuration identifying one or more resources for uplink transmissions between the second UE and a base station. The interference component 645 may be configured as or otherwise support a means for measuring an amount of interference associated with the one or more resources for uplink transmissions based on a sidelink communication link with the second UE. The report manager 650 may be configured as or otherwise support a means for transmitting, to one of the second UE or the base station, an interference measurement report including an indication of the measured amount of interference.

Figure 7:
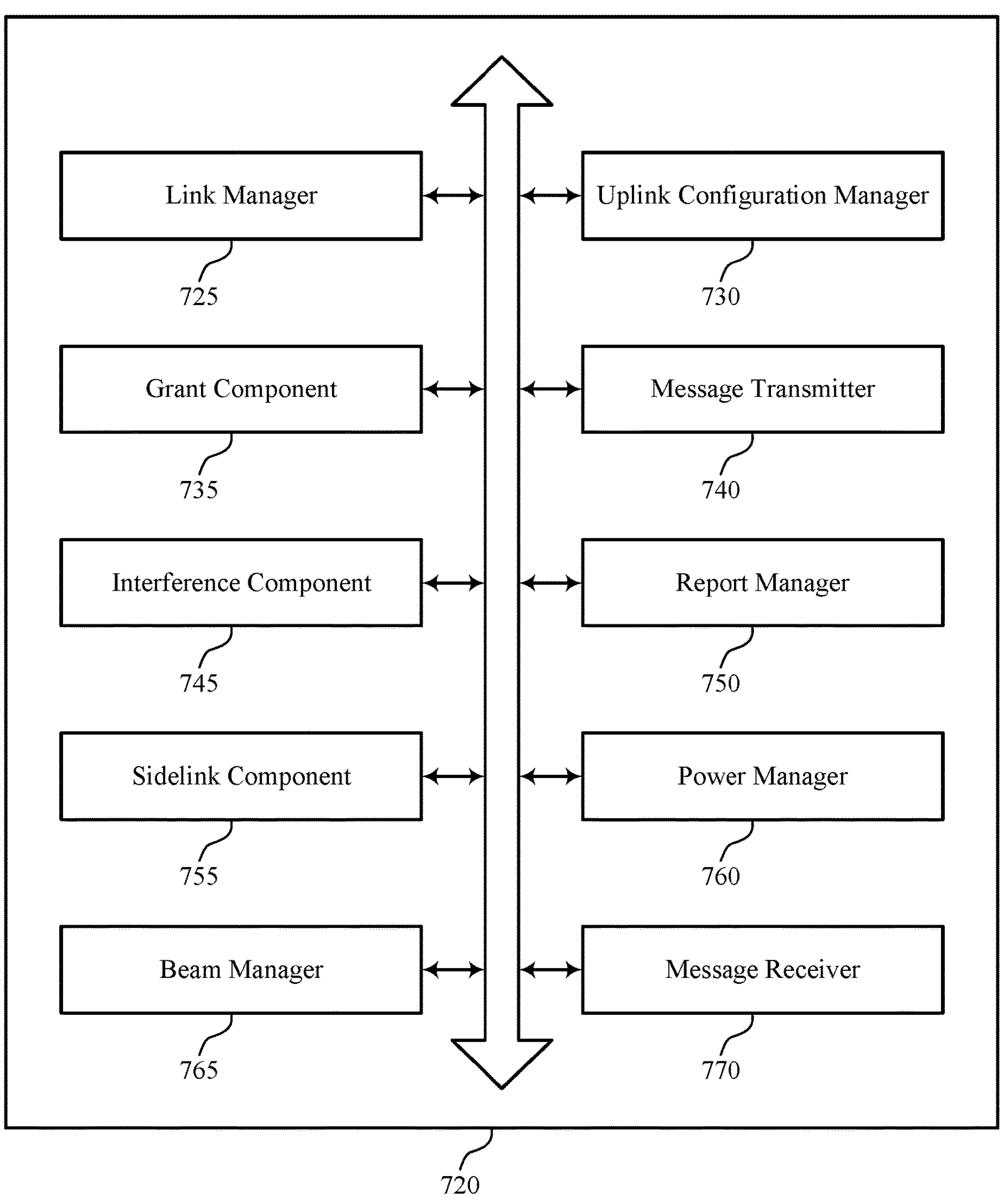
FIG. 7 shows a block diagram of a communications manager that supports techniques for full-duplex sidelink and uplink transmissions in accordance with aspects of the present disclosure.

FIG. 7 shows a block diagram 700 of a communications manager 720 that supports techniques for full-duplex sidelink and uplink transmissions in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for full-duplex sidelink and uplink transmissions as described herein. For example, the communications manager 720 may include a link manager 725, an uplink configuration manager 730, a grant component 735, a message transmitter 740, an interference component 745, a report manager 750, a sidelink component 755, a power component 760, a beam component 765, a message receiver 770, or any combination thereof. Each of these components may communicate, directly or indirectly, with one another (e.g., via one or more buses).

The communications manager 720 may support wireless communications at a first UE in accordance with examples as disclosed herein. The link manager 725 may be configured as or otherwise support a means for establishing a first communication link (e.g., an access link, a Uu interface) with a base station and a sidelink communication link (e.g., a sidelink, a PC5 interface) with a second UE. The uplink configuration manager 730 may be configured as or otherwise support a means for transmitting an indication of an uplink transmission configuration associated with the first communication link to the second UE, the uplink transmission configuration identifying one or more resources for uplink transmissions between the first UE and the base station. The grant component 735 may be configured as or otherwise support a means for receiving, from the base station, a resource grant for one or more uplink messages over the first communication link and one or more sidelink messages over the sidelink communication link, the one or more uplink messages being concurrent with the one or more sidelink messages, where the resource grant is received based on an amount of interference associated with the one or more resources for uplink transmissions. The message transmitter 740 may be configured as or otherwise support a means for transmitting the one or more sidelink messages to the first UE over the sidelink communication link and the one or more uplink messages to the base station over the first communication link based on receiving the resource grant.

In some examples, the sidelink component 755 may be configured as or otherwise support a means for transmitting an indication of a sidelink transmission configuration to the base station, the sidelink transmission configuration identifying one or more resources for sidelink transmissions between the first UE and the second UE.

In some examples, the sidelink transmission configuration includes a configuration of one or more sidelink reference signals, a configuration of a sidelink channel, an ID associated with the second UE, an ID associated with a TRP at the first UE associated with the sidelink communication link, a precoder associated with the TRP, a transmit power associated with sidelink transmissions between the first UE and the second UE, a MCS associated with sidelink transmissions between the first UE and the second UE, or any combination thereof.

In some examples, the interference component 745 may be configured as or otherwise support a means for receiving, from the second UE, an interference measurement report, the interference measurement report indicating the amount of interference associated with the one or more resources for uplink transmissions. In some examples, the report manager 750 may be configured as or otherwise support a means for transmitting the interference measurement report to the base station, where receiving the resource grant is based on transmitting the interference measurement report.

In some examples, the power component 760 may be configured as or otherwise support a means for receiving a transmit power control message from the base station, the transmit power control message instructing the first UE to adjust one or both of a transmit power associated with the one or more sidelink messages or a transmit power associated with the one or more uplink messages, where transmitting the one or more uplink messages and the one or more sidelink messages is based on the transmit power control message.

In some examples, a first TRP at the first UE associated with the first communication link and a second TRP at the first UE associated with the sidelink communication link share a transmission power, and the power component 760 may be configured as or otherwise support a means for adjusting the transmit power associated with the one or more uplink messages by a first amount and adjusting the transmit power associated with the one or more sidelink messages by a second amount based on the transmit power control message, where one or both of the first amount or the second amount are based on a downlink path loss and the amount of interference, and where a combination of the adjusted transmit power associated with the one or more uplink messages and the adjusted the transmit power associated with the one or more sidelink messages is equal to or less than a threshold transmit power.

In some examples, a first TRP at the first UE associated with the first communication link is associated with a first transmission power and a second TRP at the first UE is associated with the sidelink communication link is associated with a second transmission power, and the power component 760 may be configured as or otherwise support a means for adjusting the transmit power associated with the one or more uplink messages by a first amount and adjusting the transmit power associated with the one or more sidelink messages by a second amount based on the transmit power control message, where the first amount and the second amount are based on the amount of interference.

In some examples, the first communication link is associated with a first TRP of a set of TRPs at the first UE and the sidelink communication link is associated with a second TRP of the set of TRPs at the first UE.

In some examples, the amount of interference includes an RSRP, an SNR, an RSSI, or any combination thereof, associated with the one or more resources for uplink transmissions. In some examples, the resource grant includes at least one of a configured grant or a dynamic grant.

Additionally or alternatively, the communications manager 720 may support wireless communications at a first UE in accordance with examples as disclosed herein. In some examples, the uplink configuration manager 730 may be configured as or otherwise support a means for determining an uplink transmission configuration for a second UE, the uplink transmission configuration identifying one or more resources for uplink transmissions between the second UE and a base station. The interference component 745 may be configured as or otherwise support a means for measuring an amount of interference associated with the one or more resources for uplink transmissions based on a sidelink communication link with the second UE. The report manager 750 may be configured as or otherwise support a means for transmitting, to one of the second UE or the base station, an interference measurement report including an indication of the measured amount of interference.

In some examples, to support determining the uplink transmission configuration, the uplink configuration manager 730 may be configured as or otherwise support a means for receiving an indication of the uplink transmission configuration from the second UE, where determining the uplink transmission configuration is based on receiving the indication.

In some examples, to support determining the uplink transmission configuration, the uplink configuration manager 730 may be configured as or otherwise support a means for receiving an indication of the uplink transmission configuration from the base station, where determining the uplink transmission configuration is based on receiving the indication.

In some examples, the beam component 765 may be configured as or otherwise support a means for determining one or more beam directions for receiving sidelink transmissions from the second UE, where measuring the amount of interference is based on the determined one or more beam directions.

In some examples, to support measuring the amount of interference, the interference component 745 may be configured as or otherwise support a means for measuring an RSRP, an SNR, an RSSI, or any combination thereof, associated with the one or more resources for uplink transmissions.

In some examples, the message receiver 770 may be configured as or otherwise support a means for receiving, from the second UE, one or more sidelink messages based on transmitting the interference measurement report.

Figure 8:
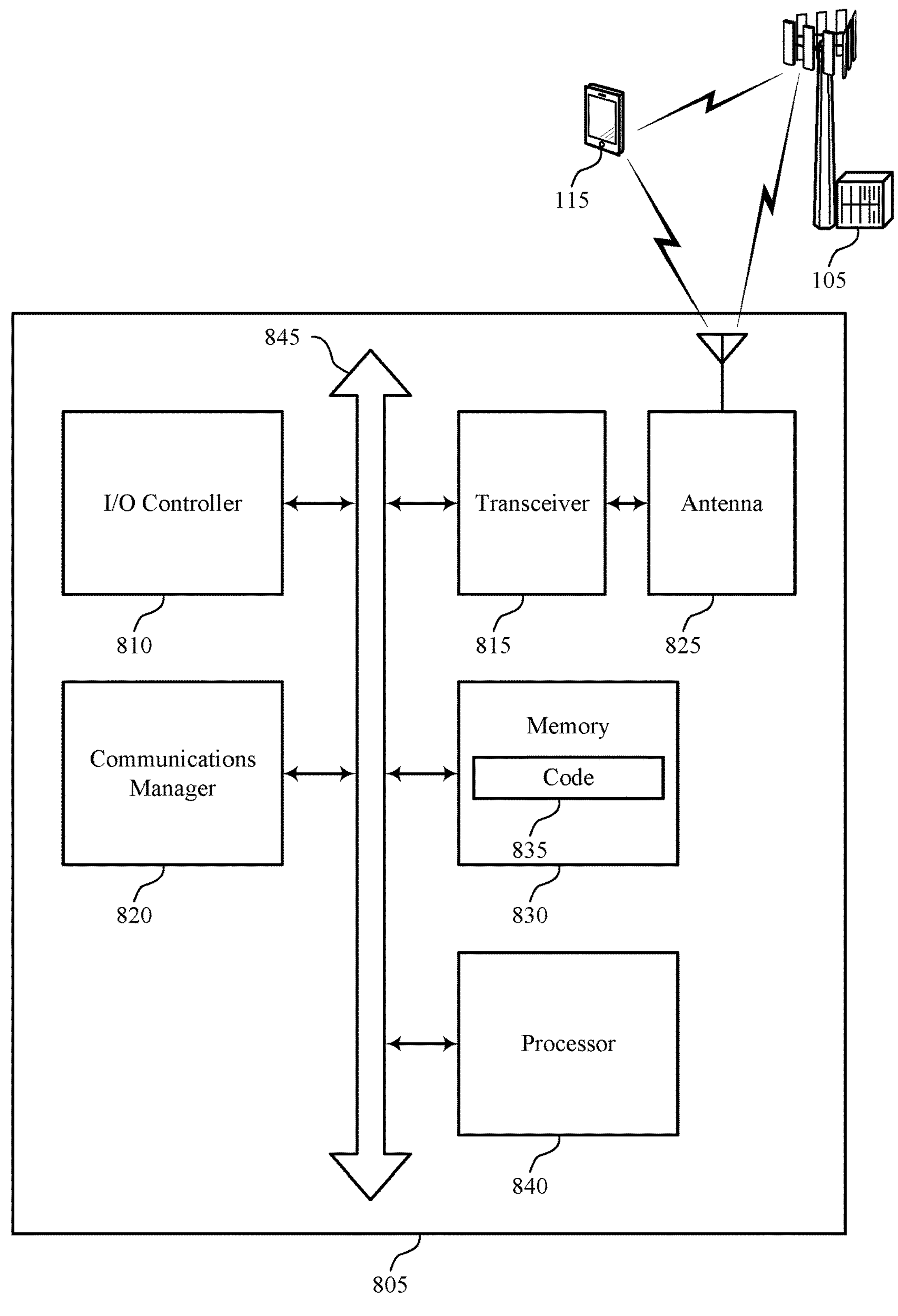
FIG. 8 shows a diagram of a system including a device that supports techniques for full-duplex sidelink and uplink transmissions in accordance with aspects of the present disclosure.

FIG. 8 shows a diagram of a system 800 including a device 805 that supports techniques for full-duplex sidelink and uplink transmissions in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for full-duplex sidelink and uplink transmissions).

For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for establishing a first communication link with a base station and a sidelink communication link with a second UE. The communications manager 820 may be configured as or otherwise support a means for transmitting an indication of an uplink transmission configuration associated with the first communication link to the second UE, the uplink transmission configuration identifying one or more resources for uplink transmissions between the first UE and the base station. The communications manager 820 may be configured as or otherwise support a means for receiving, from the base station, a resource grant for one or more uplink messages over the first communication link and one or more sidelink messages over the sidelink communication link, the one or more uplink messages being concurrent with the one or more sidelink messages, where the resource grant is received based on an amount of interference associated with the one or more resources for uplink transmissions. The communications manager 820 may be configured as or otherwise support a means for transmitting the one or more sidelink messages to the first UE over the sidelink communication link and the one or more uplink messages to the base station over the first communication link based on receiving the resource grant.

Additionally or alternatively, the communications manager 820 may support wireless communications at a first UE in accordance with examples as disclosed herein. For example, the communications manager 820 may be configured as or otherwise support a means for determining an uplink transmission configuration for a second UE, the uplink transmission configuration identifying one or more resources for uplink transmissions between the second UE and a base station. The communications manager 820 may be configured as or otherwise support a means for measuring an amount of interference associated with the one or more resources for uplink transmissions based on a sidelink communication link with the second UE. The communications manager 820 may be configured as or otherwise support a means for transmitting, to one of the second UE or the base station, an interference measurement report including an indication of the measured amount of interference.

By including or configuring the communications manager 820 in accordance with examples as described herein, the device 805 may support techniques for improved communication reliability and more efficient utilization of communication resources. For example, the device 805 may transmit concurrent uplink and sidelink transmission if the uplink/sidelink interference is below a threshold. By ensuring the interference is below a threshold, the device may improve communication reliability. That is, the device 805 may increase the ability of another device 805 and a base station to receive sidelink signals and uplink signals respectively.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for full-duplex sidelink and uplink transmissions as described herein, or the processor 840 and the memory 830 may be otherwise configured to perform or support such operations.

Figure 9:
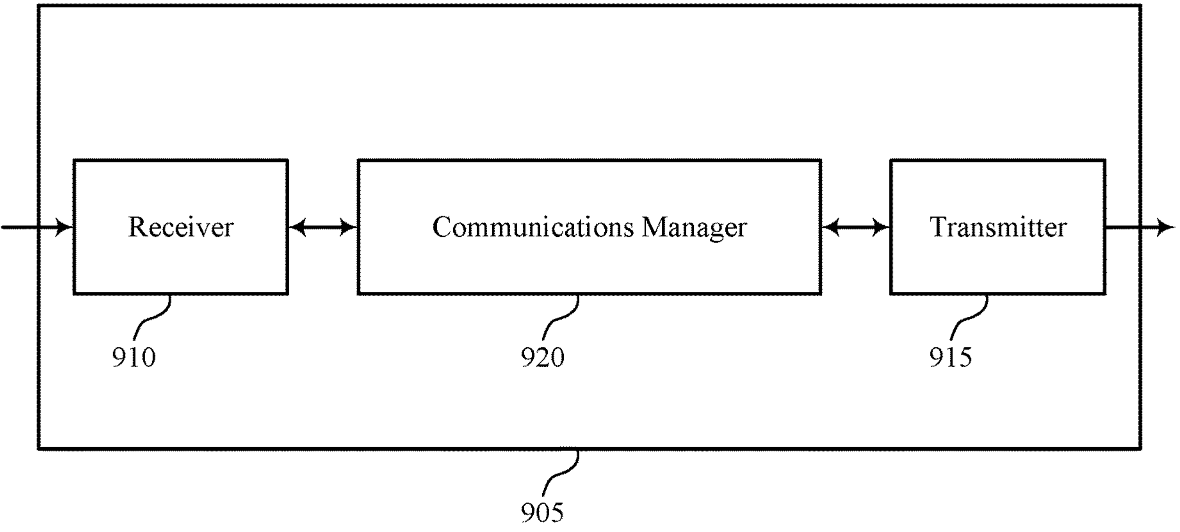
FIGS. 9 and 10 show block diagrams of devices that support techniques for full-duplex sidelink and uplink transmissions in accordance with aspects of the present disclosure.

FIG. 9 shows a block diagram 900 of a device 905 that supports techniques for full-duplex sidelink and uplink transmissions in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for full-duplex sidelink and uplink transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for full-duplex sidelink and uplink transmissions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for full-duplex sidelink and uplink transmissions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for determining a sidelink transmission configuration identifying one or more resources for sidelink transmissions between a first UE and a second UE. The communications manager 920 may be configured as or otherwise support a means for determining an amount of interference associated with the one or more resources for sidelink transmissions. The communications manager 920 may be configured as or otherwise support a means for transmitting, to the first UE, a resource grant for one or more sidelink messages and one or more uplink messages, the one or more sidelink messages being concurrent with the one or more uplink messages, where transmitting the resource grant is based on the determined amount of interference.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption and more efficient utilization of communication resources.

Figure 10:
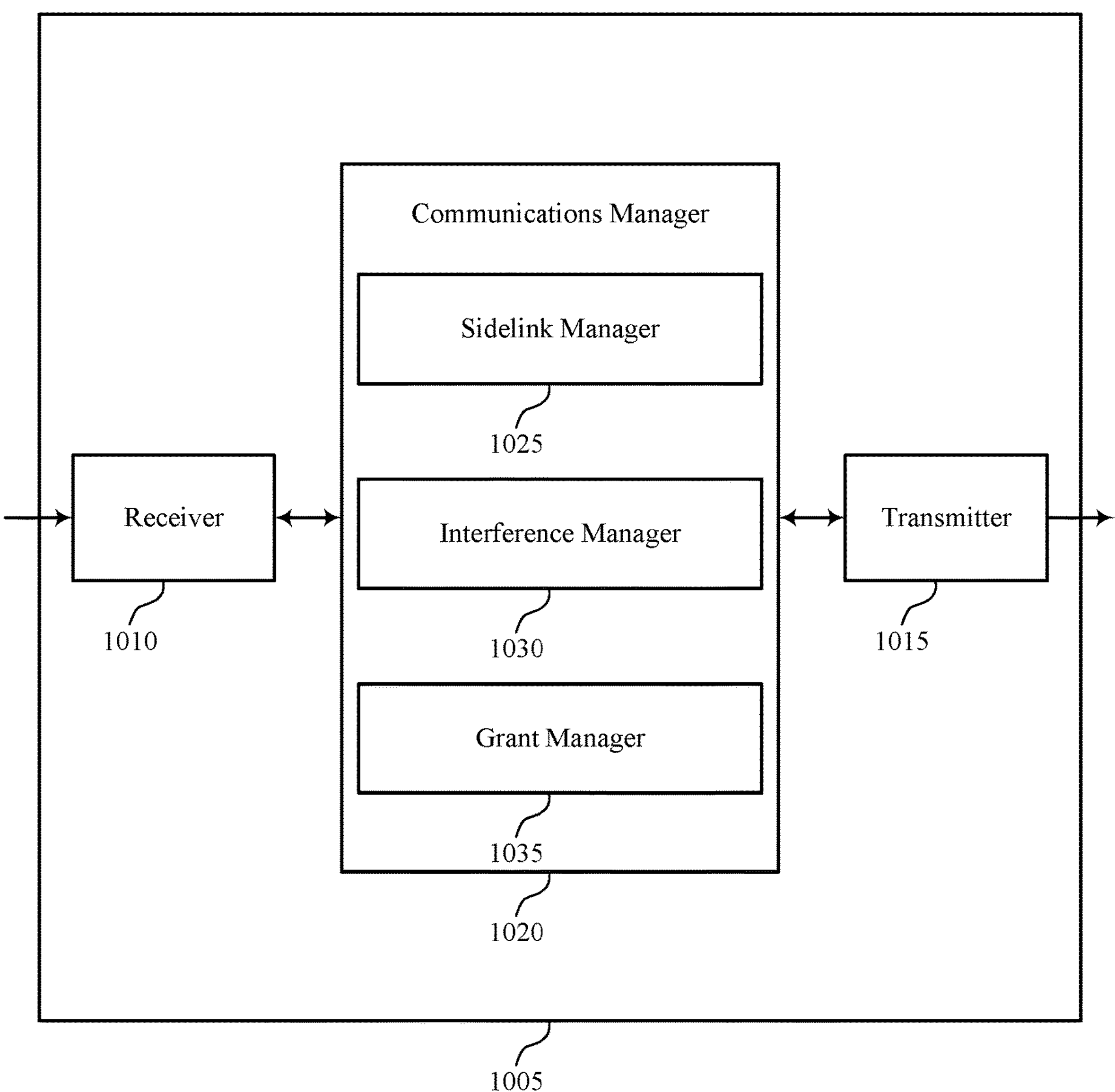

FIG. 10 shows a block diagram 1000 of a device 1005 that supports techniques for full-duplex sidelink and uplink transmissions in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for full-duplex sidelink and uplink transmissions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for full-duplex sidelink and uplink transmissions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for full-duplex sidelink and uplink transmissions as described herein. For example, the communications manager 1020 may include a sidelink manager 1025, an interference manager 1030, a grant manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The sidelink manager 1025 may be configured as or otherwise support a means for determining a sidelink transmission configuration identifying one or more resources for sidelink transmissions between a first UE and a second UE. The interference manager 1030 may be configured as or otherwise support a means for determining an amount of interference associated with the one or more resources for sidelink transmissions. The grant manager 1035 may be configured as or otherwise support a means for transmitting, to the first UE, a resource grant for one or more sidelink messages and one or more uplink messages, the one or more sidelink messages being concurrent with the one or more uplink messages, where transmitting the resource grant is based on the determined amount of interference.

Figure 11:
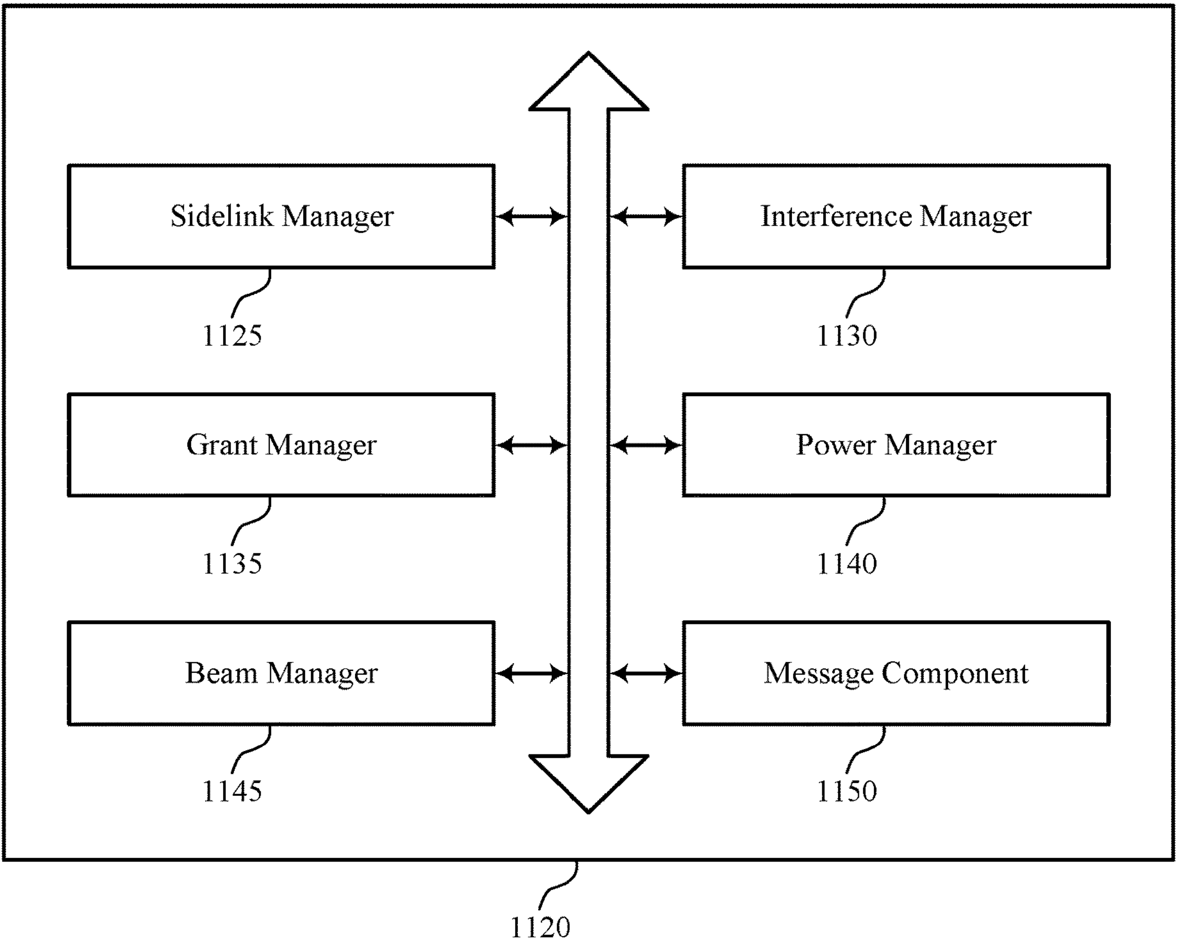
FIG. 11 shows a block diagram of a communications manager that supports techniques for full-duplex sidelink and uplink transmissions in accordance with aspects of the present disclosure.

FIG. 11 shows a block diagram 1100 of a communications manager 1120 that supports techniques for full-duplex sidelink and uplink transmissions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for full-duplex sidelink and uplink transmissions as described herein. For example, the communications manager 1120 may include a sidelink manager 1125, an interference manager 1130, a grant manager 1135, a power manager 1140, a beam manager 1145, a message component 1150, or any combination thereof. Each of these components may communicate, directly or indirectly, with one another (e.g., via one or more buses).

The communications manager 1120 may support wireless communications at a base station in accordance with examples as disclosed herein. The sidelink manager 1125 may be configured as or otherwise support a means for determining a sidelink transmission configuration identifying one or more resources for sidelink transmissions between a first UE and a second UE. The interference manager 1130 may be configured as or otherwise support a means for determining an amount of interference associated with the one or more resources for sidelink transmissions. The grant manager 1135 may be configured as or otherwise support a means for transmitting, to the first UE, a resource grant for one or more sidelink messages and one or more uplink messages, the one or more sidelink messages being concurrent with the one or more uplink messages, where transmitting the resource grant is based on the determined amount of interference.

In some examples, to support determining the sidelink transmission configuration, the sidelink manager 1125 may be configured as or otherwise support a means for receiving an indication of the sidelink transmission configuration from the first UE, where determining the sidelink transmission configuration is based on receiving the indication.

In some examples, to support determining the sidelink transmission configuration, the sidelink manager 1125 may be configured as or otherwise support a means for receiving an indication of the sidelink transmission configuration from the second UE, where determining the sidelink transmission configuration is based on receiving the indication.

In some examples, to support determining the amount of interference, the interference manager 1130 may be configured as or otherwise support a means for measuring the amount of interference associated with the one or more resources for sidelink transmissions, where transmitting the resource grant is based on the measured amount of interference.

In some examples, to support measuring the amount of interference, the interference manager 1130 may be configured as or otherwise support a means for measuring an RSRP, an SNR, an RSSI, or any combination thereof, associated with the one or more resources for sidelink transmissions.

In some examples, the interference manager 1130 may be configured as or otherwise support a means for determining the amount of interference satisfies a threshold amount of interference, where transmitting the resource grant is based on the amount of interference satisfying the threshold amount of interference.

In some examples, the power manager 1140 may be configured as or otherwise support a means for transmitting a transmit power control message to the first UE, the transmit power control message instructing the first UE to adjust one or both of a transmit power associated with the one or more sidelink messages or a transmit power associated with the one or more uplink messages.

In some examples, a first TRP at the first UE and a second TRP at the first UE share a transmission power, and the power manager 1140 may be configured as or otherwise support a means for determining a maximum transmit power (e.g., a threshold transmit power) associated with the transmission power. In some examples, a first TRP at the first UE and a second TRP at the first UE share a transmission power, and the sidelink manager 1125 may be configured as or otherwise support a means for determining a first amount to adjust the transmit power associated with the one or more sidelink messages and a second amount to adjust the transmit power associated with the one or more uplink messages, where the first amount and the second amount are determined based on a downlink path loss, the amount of interference, and the maximum transmit power, and where the transmit power control message includes the first amount and the second amount.

In some examples, a first TRP at the first UE is associated with a first transmission power and a second TRP at the first UE is associated with a second transmission power, and the power manager 1140 may be configured as or otherwise support a means for determining a first amount to adjust the transmit power associated with the one or more sidelink messages and a second amount to adjust the transmit power associated with the one or more uplink messages, where the first amount and the second amount are determined based on the amount of interference, and where the transmit power control message includes the first amount and the second amount.

In some examples, the beam manager 1145 may be configured as or otherwise support a means for determining one or more beam directions for receiving uplink transmissions from the first UE, where measuring the amount of interference is based on the determined one or more beam directions.

In some examples, the sidelink transmission configuration includes a configuration of one or more sidelink reference signals, a configuration of a sidelink channel, an ID associated with the second UE, an ID associated with a TRP at the first UE associated with sidelink transmissions, a precoder associated with the TRP, a transmit power associated with the sidelink transmissions between the first UE and the second UE, a MCS associated with sidelink transmissions between the first UE and the second UE, or any combination thereof.

In some examples, the message component 1150 may be configured as or otherwise support a means for receiving, from the first UE, the one or more uplink messages based on transmitting the resource grant.

In some examples, the resource grant includes at least one of a configured grant or a dynamic grant.

Figure 12:
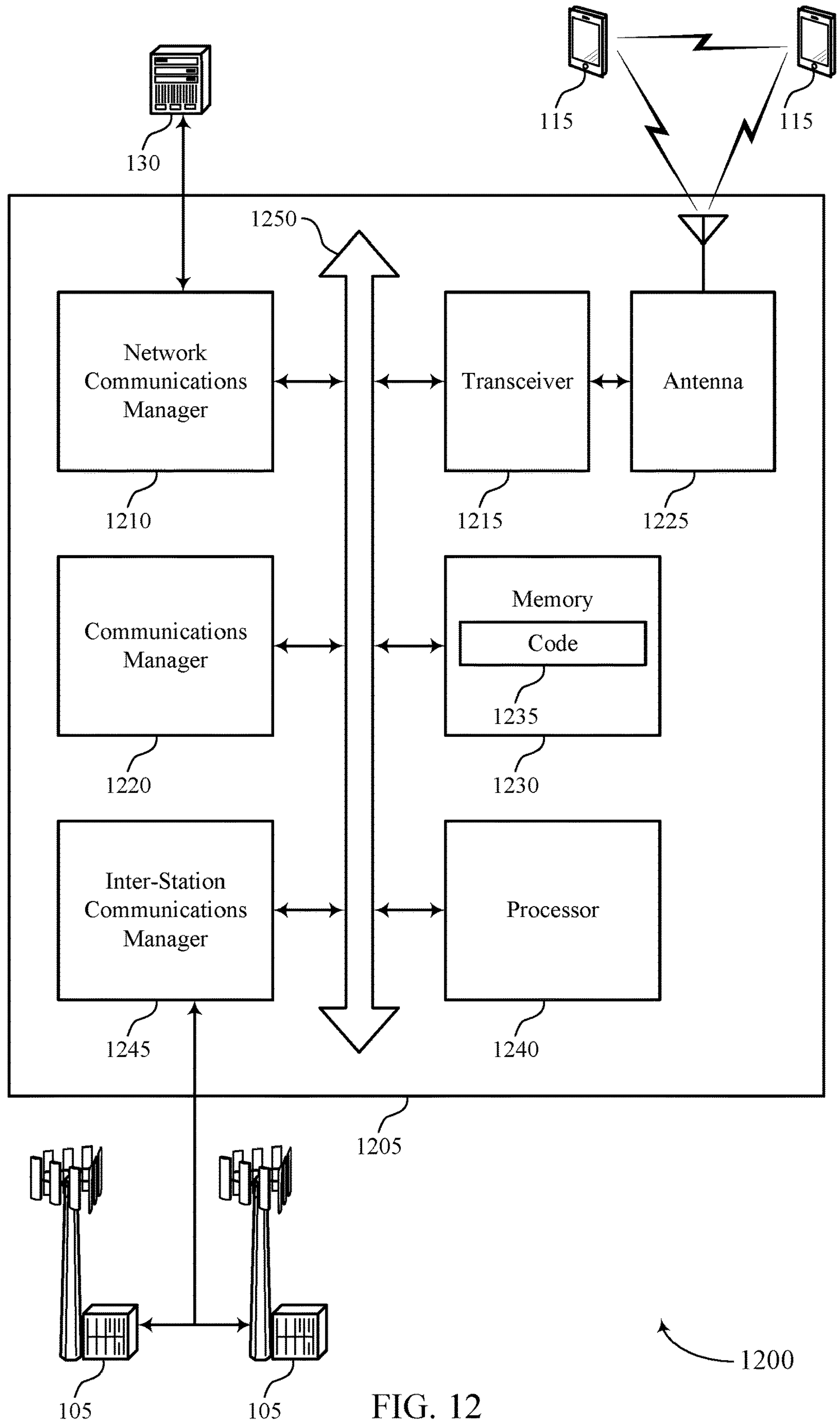
FIG. 12 shows a diagram of a system including a device that supports techniques for full-duplex sidelink and uplink transmissions in accordance with aspects of the present disclosure.

FIG. 12 shows a diagram of a system 1200 including a device 1205 that supports techniques for full-duplex sidelink and uplink transmissions in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for full-duplex sidelink and uplink transmissions). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for determining a sidelink transmission configuration identifying one or more resources for sidelink transmissions between a first UE and a second UE. The communications manager 1220 may be configured as or otherwise support a means for determining an amount of interference associated with the one or more resources for sidelink transmissions. The communications manager 1220 may be configured as or otherwise support a means for transmitting, to the first UE, a resource grant for one or more sidelink messages and one or more uplink messages, the one or more sidelink messages being concurrent with the one or more uplink messages, where transmitting the resource grant is based on the determined amount of interference.

By including or configuring the communications manager 1220 in accordance with examples as described herein, the device 1205 may support techniques for improved communication reliability and more efficient utilization of communication resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for full-duplex sidelink and uplink transmissions as described herein, or the processor 1240 and the memory 1230 may be otherwise configured to perform or support such operations.

Figure 13:
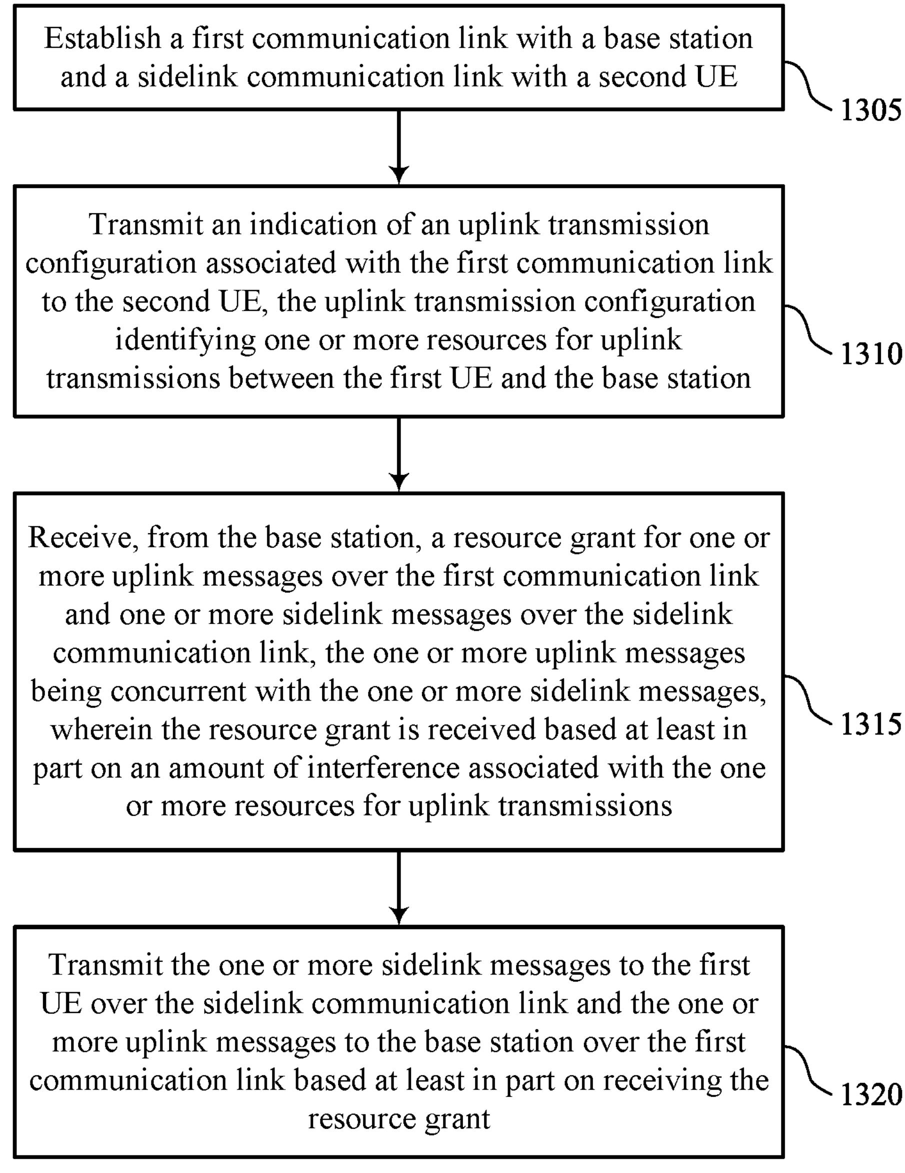
FIGS. 13 through 17 show flowcharts illustrating methods that support techniques for full-duplex sidelink and uplink transmissions in accordance with aspects of the present disclosure.

FIG. 13 shows a flowchart illustrating a method 1300 that supports techniques for full-duplex sidelink and uplink transmissions in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include establishing a first communication link with a base station and a sidelink communication link with a second UE. The operations of 1305 may be performed in accordance with examples as disclosed herein. In some examples, aspects of the operations of 1305 may be performed by a link manager 725 as described with reference to FIG. 7.

At 1310, the method may include transmitting an indication of an uplink transmission configuration associated with the first communication link to the second UE, the uplink transmission configuration identifying one or more resources for uplink transmissions between the first UE and the base station. The operations of 1310 may be performed in accordance with examples as disclosed herein. In some examples, aspects of the operations of 1310 may be performed by an uplink configuration manager 730 as described with reference to FIG. 7.

At 1315, the method may include receiving, from the base station, a resource grant for one or more uplink messages over the first communication link and one or more sidelink messages over the sidelink communication link, the one or more uplink messages being concurrent with the one or more sidelink messages, where the resource grant is received based on an amount of interference associated with the one or more resources for uplink transmissions. The operations of 1315 may be performed in accordance with examples as disclosed herein. In some examples, aspects of the operations of 1315 may be performed by a grant component 735 as described with reference to FIG. 7.

At 1320, the method may include transmitting the one or more sidelink messages to the first UE over the sidelink communication link and the one or more uplink messages to the base station over the first communication link based on receiving the resource grant. The operations of 1320 may be performed in accordance with examples as disclosed herein.

In some examples, aspects of the operations of 1320 may be performed by a message transmitter 740 as described with reference to FIG. 7.

Figure 14:
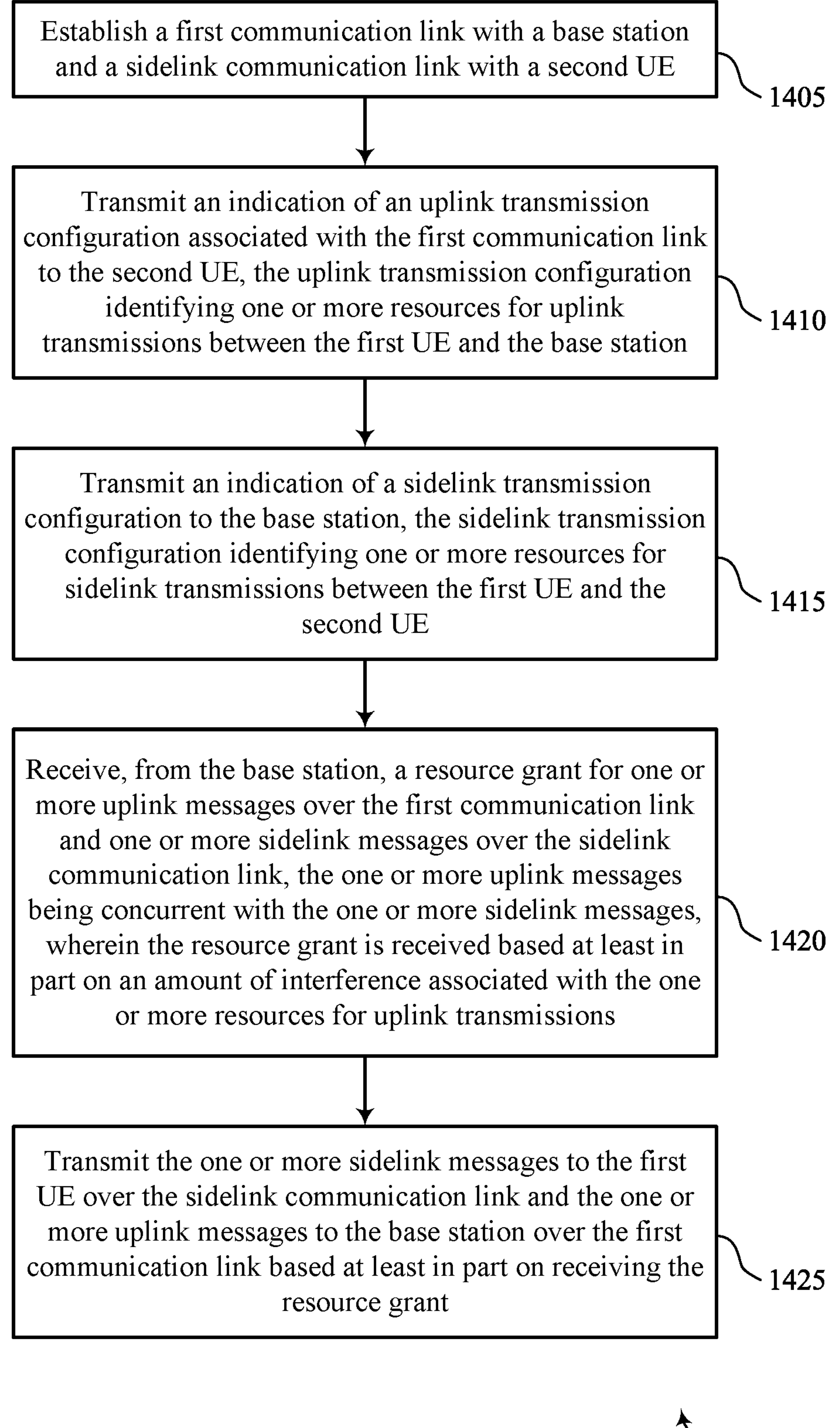

FIG. 14 shows a flowchart illustrating a method 1400 that supports techniques for full-duplex sidelink and uplink transmissions in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include establishing a first communication link with a base station and a sidelink communication link with a second UE. The operations of 1405 may be performed in accordance with examples as disclosed herein. In some examples, aspects of the operations of 1405 may be performed by a link manager 725 as described with reference to FIG. 7.

At 1410, the method may include transmitting an indication of an uplink transmission configuration associated with the first communication link to the second UE, the uplink transmission configuration identifying one or more resources for uplink transmissions between the first UE and the base station. The operations of 1410 may be performed in accordance with examples as disclosed herein. In some examples, aspects of the operations of 1410 may be performed by an uplink configuration manager 730 as described with reference to FIG. 7.

At 1415, the method may include transmitting an indication of a sidelink transmission configuration to the base station, the sidelink transmission configuration identifying one or more resources for sidelink transmissions between the first UE and the second UE. The operations of 1415 may be performed in accordance with examples as disclosed herein. In some examples, aspects of the operations of 1415 may be performed by a sidelink component 755 as described with reference to FIG. 7.

At 1420, the method may include receiving, from the base station, a resource grant for one or more uplink messages over the first communication link and one or more sidelink messages over the sidelink communication link, the one or more uplink messages being concurrent with the one or more sidelink messages, where the resource grant is received based on an amount of interference associated with the one or more resources for uplink transmissions. The operations of 1420 may be performed in accordance with examples as disclosed herein. In some examples, aspects of the operations of 1420 may be performed by a grant component 735 as described with reference to FIG. 7.

At 1425, the method may include transmitting the one or more sidelink messages to the first UE over the sidelink communication link and the one or more uplink messages to the base station over the first communication link based on receiving the resource grant. The operations of 1425 may be performed in accordance with examples as disclosed herein. In some examples, aspects of the operations of 1425 may be performed by a message transmitter 740 as described with reference to FIG. 7.

Figure 15:
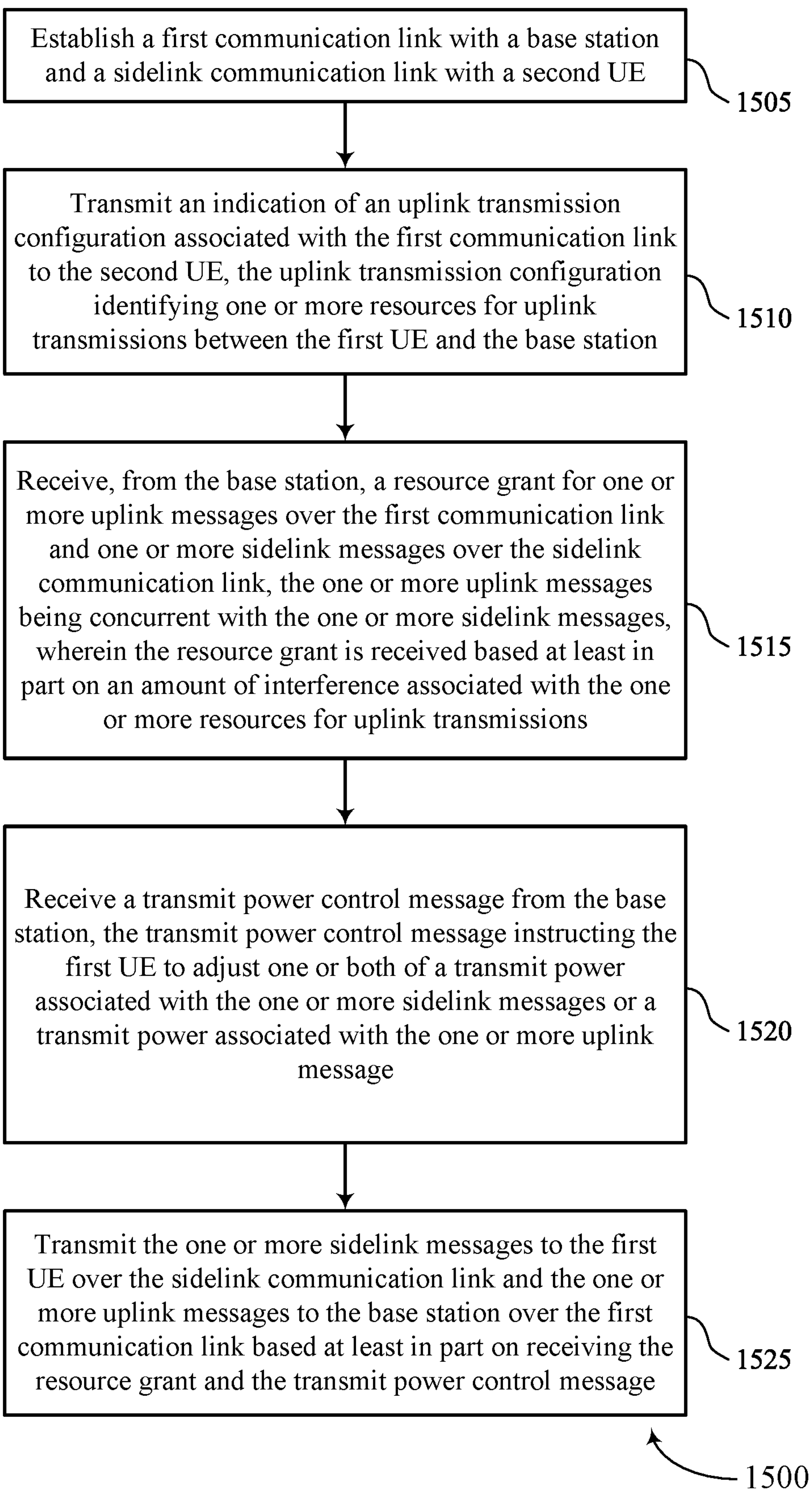

FIG. 15 shows a flowchart illustrating a method 1500 that supports techniques for full-duplex sidelink and uplink transmissions in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include establishing a first communication link with a base station and a sidelink communication link with a second UE. The operations of 1505 may be performed in accordance with examples as disclosed herein. In some examples, aspects of the operations of 1505 may be performed by a link manager 725 as described with reference to FIG. 7.

At 1510, the method may include transmitting an indication of an uplink transmission configuration associated with the first communication link to the second UE, the uplink transmission configuration identifying one or more resources for uplink transmissions between the first UE and the base station. The operations of 1510 may be performed in accordance with examples as disclosed herein. In some examples, aspects of the operations of 1510 may be performed by an uplink configuration manager 730 as described with reference to FIG. 7.

At 1515, the method may include receiving, from the base station, a resource grant for one or more uplink messages over the first communication link and one or more sidelink messages over the sidelink communication link, the one or more uplink messages being concurrent with the one or more sidelink messages, where the resource grant is received based on an amount of interference associated with the one or more resources for uplink transmissions. The operations of 1515 may be performed in accordance with examples as disclosed herein. In some examples, aspects of the operations of 1515 may be performed by a grant component 735 as described with reference to FIG. 7.

At 1520, the method may include receiving a transmit power control message from the base station, the transmit power control message instructing the first UE to adjust one or both of a transmit power associated with the one or more sidelink messages or a transmit power associated with the one or more uplink messages. The operations of 1520 may be performed in accordance with examples as disclosed herein. In some examples, aspects of the operations of 1520 may be performed by a power component 760 as described with reference to FIG. 7.

At 1525, the method may include transmitting the one or more sidelink messages to the first UE over the sidelink communication link and the one or more uplink messages to the base station over the first communication link based on receiving the resource grant and the transmit power control message. The operations of 1525 may be performed in accordance with examples as disclosed herein. In some examples, aspects of the operations of 1525 may be performed by a message transmitter 740 as described with reference to FIG. 7.

Figure 16:
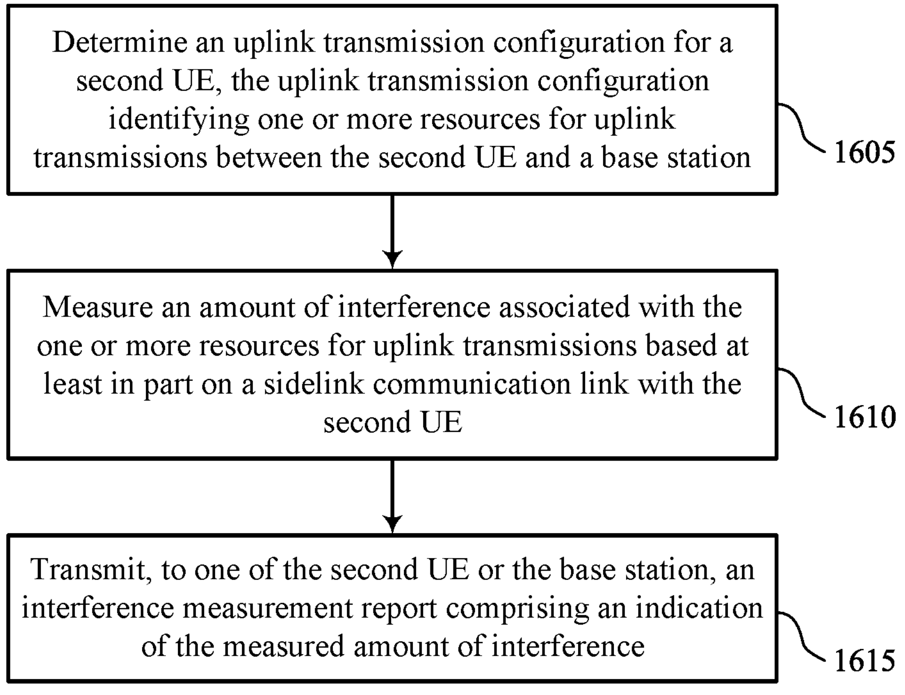

FIG. 16 shows a flowchart illustrating a method 1600 that supports techniques for full-duplex sidelink and uplink transmissions in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include determining an uplink transmission configuration for a second UE, the uplink transmission configuration identifying one or more resources for uplink transmissions between the second UE and a base station. The operations of 1605 may be performed in accordance with examples as disclosed herein. In some examples, aspects of the operations of 1605 may be performed by an uplink configuration manager 730 as described with reference to FIG. 7.

At 1610, the method may include measuring an amount of interference associated with the one or more resources for uplink transmissions based on a sidelink communication link with the second UE. The operations of 1610 may be performed in accordance with examples as disclosed herein. In some examples, aspects of the operations of 1610 may be performed by an interference component 745 as described with reference to FIG. 7.

At 1615, the method may include transmitting, to one of the second UE or the base station, an interference measurement report including an indication of the measured amount of interference. The operations of 1615 may be performed in accordance with examples as disclosed herein. In some examples, aspects of the operations of 1615 may be performed by a report manager 750 as described with reference to FIG. 7.

Figure 17:
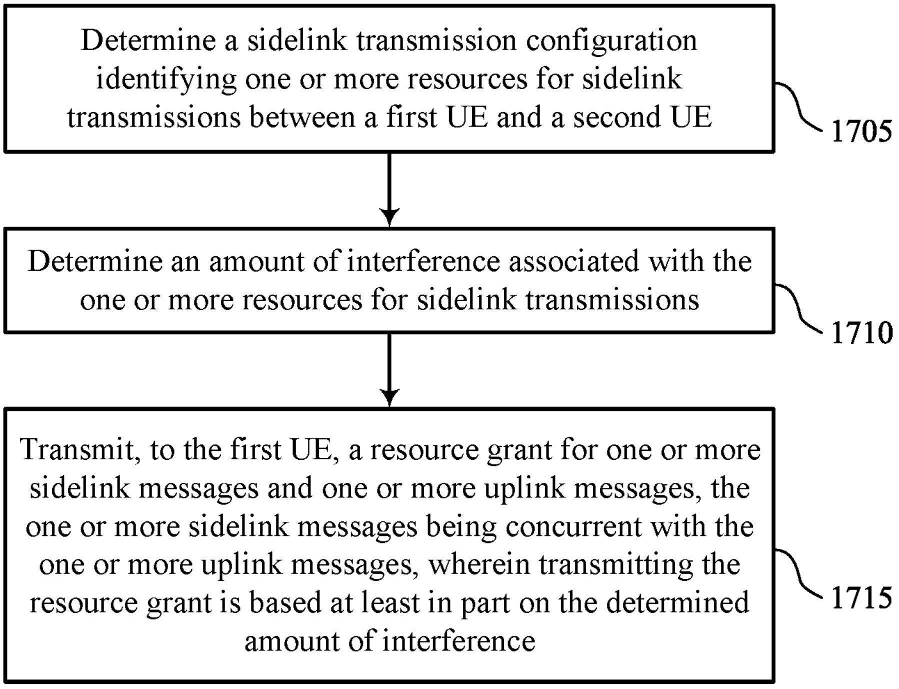

FIG. 17 shows a flowchart illustrating a method 1700 that supports techniques for full-duplex sidelink and uplink transmissions in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include determining a sidelink transmission configuration identifying one or more resources for sidelink transmissions between a first UE and a second UE. The operations of 1705 may be performed in accordance with examples as disclosed herein. In some examples, aspects of the operations of 1705 may be performed by a sidelink manager 1125 as described with reference to FIG. 11.

At 1710, the method may include determining an amount of interference associated with the one or more resources for sidelink transmissions. The operations of 1710 may be performed in accordance with examples as disclosed herein. In some examples, aspects of the operations of 1710 may be performed by an interference manager 1130 as described with reference to FIG. 11.

At 1715, the method may include transmitting, to the first UE, a resource grant for one or more sidelink messages and one or more uplink messages, the one or more sidelink messages being concurrent with the one or more uplink messages, where transmitting the resource grant is based on the determined amount of interference. The operations of 1715 may be performed in accordance with examples as disclosed herein. In some examples, aspects of the operations of 1715 may be performed by a grant manager 1135 as described with reference to FIG. 11.

The following provides an overview of aspects of the present disclosure:

Aspect 1: A method for wireless communications at a first UE, comprising: establishing a first communication link with a base station and a sidelink communication link with a second UE; transmitting an indication of an uplink transmission configuration associated with the first communication link to the second UE, the uplink transmission configuration identifying one or more resources for uplink transmissions between the first UE and the base station; receiving, from the base station, a resource grant for one or more uplink messages over the first communication link and one or more sidelink messages over the sidelink communication link, the one or more uplink messages being concurrent with the one or more sidelink messages, wherein the resource grant is received based at least in part on an amount of interference associated with the one or more resources for uplink transmissions; and transmitting the one or more sidelink messages to the first UE over the sidelink communication link and the one or more uplink messages to the base station over the first communication link based at least in part on receiving the resource grant.

Aspect 2: The method of aspect 1, further comprising: transmitting an indication of a sidelink transmission configuration to the base station, the sidelink transmission configuration identifying one or more resources for sidelink transmissions between the first UE and the second UE.

Aspect 3: The method of aspect 2, wherein the sidelink transmission configuration comprises a configuration of one or more sidelink reference signals, a configuration of a sidelink channel, an ID associated with the second UE, an ID associated with a TRP at the first UE associated with the sidelink communication link, a precoder associated with the TRP, a transmit power associated with sidelink transmissions between the first UE and the second UE, a MCS associated with sidelink transmissions between the first UE and the second UE, or any combination thereof.

Aspect 4: The method of any of aspects 1 through 3, further comprising: receiving, from the second UE, an interference measurement report, the interference measurement report indicating the amount of interference associated with the one or more resources for uplink transmissions; and transmitting the interference measurement report to the base station, wherein receiving the resource grant is based at least in part on transmitting the interference measurement report.

Aspect 5: The method of any of aspects 1 through 4, further comprising: receiving a transmit power control message from the base station, the transmit power control message instructing the first UE to adjust one or both of a transmit power associated with the one or more sidelink messages or a transmit power associated with the one or more uplink messages, wherein transmitting the one or more uplink messages and the one or more sidelink messages is based at least in part on the transmit power control message.

Aspect 6: The method of aspect 5, wherein a first TRP at the first UE associated with the first communication link and a second TRP at the first UE associated with the sidelink communication link share a transmission power, the method further comprising: adjusting the transmit power associated with the one or more uplink messages by a first amount and adjusting the transmit power associated with the one or more sidelink messages by a second amount based at least in part on the transmit power control message, wherein one or both of the first amount or the second amount are based at least in part on a downlink path loss and the amount of interference, and wherein a combination of the adjusted transmit power associated with the one or more uplink messages and the adjusted the transmit power associated with the one or more sidelink messages is equal to or less than a threshold transmit power.

Aspect 7: The method of aspect 5, wherein a first TRP at the first UE associated with the first communication link is associated with a first transmission power and a second TRP at the first UE is associated with the sidelink communication link is associated with a second transmission power, the method further comprising: adjusting the transmit power associated with the one or more uplink messages by a first amount and adjusting the transmit power associated with the one or more sidelink messages by a second amount based at least in part on the transmit power control message, wherein the first amount and the second amount are based on the amount of interference.

Aspect 8: The method of any of aspects 1 through 7, wherein the first communication link is associated with a first TRP of a set of TRPs at the first UE and the sidelink communication link is associated with a second TRP of the set of TRPs at the first UE.

Aspect 9: The method of any of aspects 1 through 8, wherein the amount of interference comprises an RSRP, an SNR, an RSSI, or any combination thereof, associated with the one or more resources for uplink transmissions.

Aspect 10: The method of any of aspects 1 through 9, wherein the resource grant comprises at least one of a configured grant or a dynamic grant.

Aspect 11: A method for wireless communications at a first UE, comprising: determining an uplink transmission configuration for a second UE, the uplink transmission configuration identifying one or more resources for uplink transmissions between the second UE and a base station; measuring an amount of interference associated with the one or more resources for uplink transmissions based at least in part on a sidelink communication link with the second UE; and transmitting, to one of the second UE or the base station, an interference measurement report comprising an indication of the measured amount of interference.

Aspect 12: The method of aspect 11, wherein determining the uplink transmission configuration comprises: receiving an indication of the uplink transmission configuration from the second UE, wherein determining the uplink transmission configuration is based at least in part on receiving the indication.

Aspect 13: The method of aspect 11, wherein determining the uplink transmission configuration comprises: receiving an indication of the uplink transmission configuration from the base station, wherein determining the uplink transmission configuration is based at least in part on receiving the indication.

Aspect 14: The method of any of aspects 11 through 13, further comprising: determining one or more beam directions for receiving sidelink transmissions from the second UE, wherein measuring the amount of interference is based at least in part on the determined one or more beam directions.

Aspect 15: The method of any of aspects 11 through 14, wherein measuring the amount of interference comprises: measuring an RSRP, an SNR, an RSSI, or any combination thereof, associated with the one or more resources for uplink transmissions.

Aspect 16: The method of any of aspects 11 through 15, further comprising: receiving, from the second UE, one or more sidelink messages based at least in part on transmitting the interference measurement report.

Aspect 17: A method for wireless communications at a base station, comprising: determining a sidelink transmission configuration identifying one or more resources for sidelink transmissions between a first UE and a second UE; determining an amount of interference associated with the one or more resources for sidelink transmissions; and transmitting, to the first UE, a resource grant for one or more sidelink messages and one or more uplink messages, the one or more sidelink messages being concurrent with the one or more uplink messages, wherein transmitting the resource grant is based at least in part on the determined amount of interference.

Aspect 18: The method of aspect 17, wherein determining the sidelink transmission configuration comprises: receiving an indication of the sidelink transmission configuration from the first UE, wherein determining the sidelink transmission configuration is based at least in part on receiving the indication.

Aspect 19: The method of aspect 17, wherein determining the sidelink transmission configuration comprises: receiving an indication of the sidelink transmission configuration from the second UE, wherein determining the sidelink transmission configuration is based at least in part on receiving the indication.

Aspect 20: The method of any of aspects 17 through 19, wherein determining the amount of interference comprises: measuring the amount of interference associated with the one or more resources for sidelink transmissions, wherein transmitting the resource grant is based at least in part on the measured amount of interference.

Aspect 21: The method of aspect 20, wherein measuring the amount of interference comprises: measuring an RSRP, an SNR, an RSSI, or any combination thereof, associated with the one or more resources for sidelink transmissions.

Aspect 22: The method of any of aspects 17 through 21, further comprising: determining the amount of interference satisfies a threshold amount of interference, wherein transmitting the resource grant is based at least in part on the amount of interference satisfying the threshold amount of interference.

Aspect 23: The method of any of aspects 17 through 22, further comprising: transmitting a transmit power control message to the first UE, the transmit power control message instructing the first UE to adjust one or both of a transmit power associated with the one or more sidelink messages or a transmit power associated with the one or more uplink messages.

Aspect 24: The method of aspect 23, wherein a first TRP at the first UE and a second TRP at the first UE share a transmission power, the method further comprising: determining a maximum transmit power associated with the transmission power; and determining a first amount to adjust the transmit power associated with the one or more sidelink messages and a second amount to adjust the transmit power associated with the one or more uplink messages, wherein the first amount and the second amount are determined based on a downlink path loss, the amount of interference, and the maximum transmit power, and wherein the transmit power control message comprises the first amount and the second amount.

Aspect 25: The method of aspect 23, wherein a first TRP at the first UE is associated with a first transmission power and a second TRP at the first UE is associated with a second transmission power, the method further comprising: determining a first amount to adjust the transmit power associated with the one or more sidelink messages and a second amount to adjust the transmit power associated with the one or more uplink messages, wherein the first amount and the second amount are determined based on the amount of interference, and wherein the transmit power control message comprises the first amount and the second amount.

Aspect 26: The method of any of aspects 17 through 25, further comprising: determining one or more beam directions for receiving uplink transmissions from the first UE, wherein measuring the amount of interference is based at least in part on the determined one or more beam directions.

Aspect 27: The method of any of aspects 17 through 26, wherein the sidelink transmission configuration comprises a configuration of one or more sidelink reference signals, a configuration of a sidelink channel, an ID associated with the second UE, an ID associated with a TRP at the first UE associated with sidelink transmissions, a precoder associated with the TRP, a transmit power associated with the sidelink transmissions between the first UE and the second UE, a MCS associated with sidelink transmissions between the first UE and the second UE, or any combination thereof.

Aspect 28: The method of any of aspects 17 through 27, further comprising: receiving, from the first UE, the one or more uplink messages based at least in part on transmitting the resource grant.

Aspect 29: The method of any of aspects 17 through 28, wherein the resource grant comprises at least one of a configured grant or a dynamic grant.

Aspect 30: An apparatus for wireless communications at a first UE, comprising a processor; memory coupled with the processor; and instructions stored in the memory and executable by the processor to cause the apparatus to perform a method of any of aspects 1 through 10.

Aspect 31: An apparatus for wireless communications at a first UE, comprising at least one means for performing a method of any of aspects 1 through 10.

Aspect 32: A non-transitory computer-readable medium storing code for wireless communications at a first UE, the code comprising instructions executable by a processor to perform a method of any of aspects 1 through 10.

Aspect 33: An apparatus for wireless communications at a first UE, comprising a processor; memory coupled with the processor; and instructions stored in the memory and executable by the processor to cause the apparatus to perform a method of any of aspects 11 through 16.

Aspect 34: An apparatus for wireless communications at a first UE, comprising at least one means for performing a method of any of aspects 11 through 16.

Aspect 35: A non-transitory computer-readable medium storing code for wireless communications at a first UE, the code comprising instructions executable by a processor to perform a method of any of aspects 11 through 16.

Aspect 36: An apparatus for wireless communications at a base station, comprising a processor; memory coupled with the processor; and instructions stored in the memory and executable by the processor to cause the apparatus to perform a method of any of aspects 17 through 29.

Aspect 37: An apparatus for wireless communications at a base station, comprising at least one means for performing a method of any of aspects 17 through 29.

Aspect 38: A non-transitory computer-readable medium storing code for wireless communications at a base station, the code comprising instructions executable by a processor to perform a method of any of aspects 17 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:

establishing a first communication link with a network node and a sidelink communication link with a second UE;

transmitting an indication of an uplink transmission configuration associated with the first communication link to the second UE, the uplink transmission configuration identifying one or more resources for uplink transmissions between the first UE and the network node;

receiving, from the network node, a resource grant for one or more uplink messages over the first communication link and one or more sidelink messages over the sidelink communication link, the resource grant scheduling simultaneous transmission of the one or more uplink messages and the one or more sidelink messages, wherein the resource grant is received based at least in part on an amount of interference associated with the one or more resources for uplink transmissions; and transmitting the one or more sidelink messages to the first UE over the sidelink communication link and the one or more uplink messages to the network node over the first communication link based at least in part on receiving the resource grant.

2. The method of claim 1, further comprising:

transmitting an indication of a sidelink transmission configuration to the network node, the sidelink transmission configuration identifying one or more resources for sidelink transmissions between the first UE and the second UE.

3. The method of claim 2, wherein the sidelink transmission configuration comprises a configuration of one or more sidelink reference signals, a configuration of a sidelink channel, an identifier associated with the second UE, an identifier associated with a transmission reception point at the first UE associated with the sidelink communication link, a precoder associated with the transmission reception point, a transmit power associated with sidelink transmissions between the first UE and the second UE, a modulation and coding scheme associated with sidelink transmissions between the first UE and the second UE, or any combination thereof.

4. The method of claim 1, further comprising:

receiving, from the second UE, an interference measurement report, the interference measurement report indicating the amount of interference associated with the one or more resources for uplink transmissions; and transmitting the interference measurement report to the network node, wherein receiving the resource grant is based at least in part on transmitting the interference measurement report.

5. The method of claim 1, further comprising:

receiving a transmit power control message from the network node, the transmit power control message instructing the first UE to adjust one or both of a transmit power associated with the one or more sidelink messages or a transmit power associated with the one or more uplink messages, wherein transmitting the one or more uplink messages and the one or more sidelink messages is based at least in part on the transmit power control message.

6. The method of claim 5, wherein a first transmission reception point at the first UE associated with the first communication link and a second transmission reception point at the first UE associated with the sidelink communication link share a transmission power, the method further comprising:

adjusting the transmit power associated with the one or more uplink messages by a first amount and adjusting the transmit power associated with the one or more sidelink messages by a second amount based at least in part on the transmit power control message, wherein one or both of the first amount or the second amount are based at least in part on a downlink path loss and the amount of interference, and wherein a combination of the adjusted transmit power associated with the one or more uplink messages and the adjusted the transmit power associated with the one or more sidelink messages is equal to or less than a threshold transmit power.

7. The method of claim 5, wherein a first transmission reception point at the first UE associated with the first communication link is associated with a first transmission power and a second transmission reception point at the first UE is associated with the sidelink communication link is associated with a second transmission power, the method further comprising:

adjusting the transmit power associated with the one or more uplink messages by a first amount and adjusting the transmit power associated with the one or more sidelink messages by a second amount based at least in part on the transmit power control message, wherein the first amount and the second amount are based on the amount of interference.

8. The method of claim 1, wherein the first communication link is associated with a first transmission reception point of a set of transmission reception points at the first UE and the sidelink communication link is associated with a second transmission reception point of the set of transmission reception points at the first UE.

9. The method of claim 1, wherein the amount of interference comprises a reference signal received power, a signal-to-noise ratio, a received signal strength indicator, or any combination thereof, associated with the one or more resources for uplink transmissions.

10. The method of claim 1, wherein the resource grant comprises at least one of a configured grant or a dynamic grant.

11. A method for wireless communications at a first user equipment (UE), comprising:

receiving, from a network node, an indication of an uplink transmission configuration for a second UE, the uplink transmission configuration identifying one or more resources for uplink transmissions between the second UE and the network node;

measuring an amount of interference associated with the one or more resources for uplink transmissions based at least in part on a sidelink communication link with the second UE; and transmitting, to one of the second UE or the network node, an interference measurement report comprising an indication of the measured amount of interference.

12. The method of claim 11, further comprising:

determining one or more beam directions for receiving sidelink transmissions from the second UE, wherein measuring the amount of interference is based at least in part on the determined one or more beam directions.

13. The method of claim 11, wherein measuring the amount of interference comprises:

measuring a reference signal received power, a signal-to-noise ratio, a received signal strength indicator, or any combination thereof, associated with the one or more resources for uplink transmissions.

14. The method of claim 11, further comprising:

receiving, from the second UE, one or more sidelink messages based at least in part on transmitting the interference measurement report.

15. A method for wireless communications at a network node, comprising:

determining a sidelink transmission configuration identifying one or more resources for sidelink transmissions between a first UE and a second UE;

determining an amount of interference associated with the one or more resources for sidelink transmissions; and transmitting, to the first UE, a resource grant for one or more sidelink messages and one or more uplink messages, the resource grant scheduling simultaneous transmission of the one or more sidelink messages and the one or more uplink messages, wherein transmitting the resource grant is based at least in part on the determined amount of interference.

16. The method of claim 15, wherein determining the sidelink transmission configuration comprises:

receiving an indication of the sidelink transmission configuration from the first UE, wherein determining the sidelink transmission configuration is based at least in part on receiving the indication.

17. The method of claim 15, wherein determining the sidelink transmission configuration comprises:

receiving an indication of the sidelink transmission configuration from the second UE, wherein determining the sidelink transmission configuration is based at least in part on receiving the indication.

18. The method of claim 15, wherein determining the amount of interference comprises:

measuring the amount of interference associated with the one or more resources for sidelink transmissions, wherein transmitting the resource grant is based at least in part on the measured amount of interference.

19. The method of claim 18, wherein measuring the amount of interference comprises:

measuring a reference signal received power, a signal-to-noise ratio, a received signal strength indicator, or any combination thereof, associated with the one or more resources for sidelink transmissions.

20. The method of claim 15, further comprising:

determining the amount of interference satisfies a threshold amount of interference, wherein transmitting the resource grant is based at least in part on the amount of interference satisfying the threshold amount of interference.

21. The method of claim 15, further comprising:

transmitting a transmit power control message to the first UE, the transmit power control message instructing the first UE to adjust one or both of a transmit power associated with the one or more sidelink messages or a transmit power associated with the one or more uplink messages.

22. The method of claim 21, wherein a first transmission reception point at the first UE and a second transmission reception point at the first UE share a transmission power, the method further comprising:

determining a maximum transmit power associated with the transmission power; and determining a first amount to adjust the transmit power associated with the one or more sidelink messages and a second amount to adjust the transmit power associated with the one or more uplink messages, wherein the first amount and the second amount are determined based on a downlink path loss, the amount of interference, and the maximum transmit power, and wherein the transmit power control message comprises the first amount and the second amount.

23. The method of claim 21, wherein a first transmission reception point at the first UE is associated with a first transmission power and a second transmission reception point at the first UE is associated with a second transmission power, the method further comprising:

determining a first amount to adjust the transmit power associated with the one or more sidelink messages and a second amount to adjust the transmit power associated with the one or more uplink messages, wherein the first amount and the second amount are determined based on the amount of interference, and wherein the transmit power control message comprises the first amount and the second amount.

24. The method of claim 15, further comprising:

determining one or more beam directions for receiving uplink transmissions from the first UE, wherein measuring the amount of interference is based at least in part on the determined one or more beam directions.

25. The method of claim 15, wherein the sidelink transmission configuration comprises a configuration of one or more sidelink reference signals, a configuration of a sidelink channel, an identifier associated with the second UE, an identifier associated with a transmission reception point at the first UE associated with sidelink transmissions, a precoder associated with the transmission reception point, a transmit power associated with the sidelink transmissions between the first UE and the second UE, a modulation and coding scheme associated with sidelink transmissions between the first UE and the second UE, or any combination thereof.

26. The method of claim 15, further comprising:

receiving, from the first UE, the one or more uplink messages based at least in part on transmitting the resource grant.

27. The method of claim 15, wherein the resource grant comprises at least one of a configured grant or a dynamic grant.

28. An apparatus for wireless communications at a first user equipment (UE), comprising:

one or more processors;

one or more memories coupled with the one or more processors; and instructions stored in the one or more memories and executable by the one or more processors to cause the apparatus to:

establish a first communication link with a network node and a sidelink communication link with a second UE;

transmit an indication of an uplink transmission configuration associated with the first communication link to the second UE, the uplink transmission configuration identifying one or more resources for uplink transmissions between the first UE and the network node;

receive, from the network node, a resource grant for one or more uplink messages over the first communication link and one or more sidelink messages over the sidelink communication link, the resource grant scheduling simultaneous transmission of the one or more uplink messages and the one or more sidelink messages, wherein the resource grant is received based at least in part on an amount of interference associated with the one or more resources for uplink transmissions; and transmit the one or more sidelink messages to the first UE over the sidelink communication link and the one or more uplink messages to the network node over the first communication link based at least in part on receiving the resource grant.

* * * * *